United States Patent
Oonami

(10) Patent No.: US 9,134,938 B2
(45) Date of Patent: Sep. 15, 2015

(54) INFORMATION PROCESSING APPARATUS AND METHOD FOR SETTING PRINTING INFORMATION

(71) Applicant: Oki Data Corporation, Tokyo (JP)

(72) Inventor: Ryoichi Oonami, Tokyo (JP)

(73) Assignee: OKI DATA CORPORATION, Tokyo (JP)

( * ) Notice: Subject to any disclaimer, the term of this patent is extended or adjusted under 35 U.S.C. 154(b) by 0 days.

(21) Appl. No.: 13/919,606

(22) Filed: Jun. 17, 2013

(65) Prior Publication Data

US 2013/0335775 A1    Dec. 19, 2013

(30) Foreign Application Priority Data

Jun. 18, 2012    (JP) ................... 2012-136564

(51) Int. Cl.
*G06K 15/00* (2006.01)
*G06F 3/12* (2006.01)

(52) U.S. Cl.
CPC ............ *G06F 3/1256* (2013.01); *G06F 3/1205* (2013.01); *G06F 3/1253* (2013.01); *G06F 3/1285* (2013.01); *G06F 3/1293* (2013.01)

(58) Field of Classification Search
CPC .............................. G06F 3/1256; G06F 3/1293
See application file for complete search history.

(56) References Cited

U.S. PATENT DOCUMENTS

| 6,480,209 | B1 | 11/2002 | Jin |
| 2006/0075363 | A1 | 4/2006 | Mizoguchi |
| 2010/0107115 | A1* | 4/2010 | Sareen et al. ................. 715/783 |

FOREIGN PATENT DOCUMENTS

| EP | 0745929 A1 | 12/1996 |
| JP | 2000-250683 A | 9/2000 |
| JP | 2001-117746 A | 4/2001 |
| JP | 2010-277337 A | 12/2010 |
| WO | WO-94/11804 A1 | 5/1994 |

* cited by examiner

*Primary Examiner* — Dov Popovici
(74) *Attorney, Agent, or Firm* — Rabin & Berdo, P.C.

(57) ABSTRACT

An information processing apparatus connected to a printer includes dialog screen producing section, a common preview producing section, and a display section. The dialog screen producing section is configured to produce a dialog screen that includes a plurality of tab sheets. The tab sheets prompt an operator to input first setting information for printing. The common preview producing section is configured to produce a common preview image that should be displayed on the dialog screen. The common preview image appears in all of the plurality of tab sheets. The display section is configured to display the dialog screen and the common preview image.

28 Claims, 14 Drawing Sheets

INFORMATION PROCESSING APPARATUS AND METHOD FOR SETTING PRINTING INFORMATION

BACKGROUND OF THE INVENTION

1. Field of the Invention

The present invention relates to an information processing apparatus connected to a printer, and more particularly to an information processing apparatus in which an operator inputs a variety of items of setting information through a dialog screen having a plurality of tab sheets and the operator is informed of items of setting information inputted through the tab sheets. The present invention also relates to a method for setting printing information.

2. Description of the Related Art

Computers including personal computers (PCs) and work stations (WS) are commonly used as information processing apparatus that drive printers to print images. An information processing apparatus incorporates a variety of programs for printing operations: application programs and a printer driver program. The application programs are used for creating data including characters, graphics, and tables. The printer driver controls the printing operation of the printer.

The application program and printer driver have a displaying function for displaying a variety of preview images, thereby informing the operator of a variety of items of setting information about functions performed by the application program and the printer driver. For example, the application programs and printer driver are commonly configured to display "apparatus preview image" and "print image preview image."

The function of displaying the "apparatus preview image" is performed when a preview image is displayed on a display unit, the preview image representing the information about the printer including configuration and functions of the printer and paper trays.

The function of displaying the "print image preview" is performed to show on the display unit the data including characters, graphics, and tables as it would look on the printed page.

For example, when the operator wants to print data including characters, graphics, and tables created by an application program, the operator inputs a variety of items of information about the printer driver, including size of an original, number of copies, orientation of the images, magnification, and print options. The print options include simplex printing, duplex printing, and N-up printing. The N-up printing is a printing layout where N individual output pages are formatted side-by-side across, for example, a print paper.

When inputting the setting information about the printer driver function, the operator operates the information processing apparatus to activate the printer driver. In response to the command from the operator, the information processing apparatus causes the displaying section to display a printing setting dialog screen that prompts the operator to input the setting information about the printer driver.

The "print setting dialog screen" is configured to display a setting information inputting area and a preview image displaying area. The "setting information inputting area" receives the setting information about the print driver from the operator. The setting information inputting area includes a radio button, a combo box, a check box, and a text box. The "preview image displaying area" is used for displaying a preview image. The preview image provides an easy-to-understand display of the setting information inputted into the setting input area.

The operator inputs the setting information about the printer driver through the printing setting dialog screen, so that the operator can check the input setting information by means of the preview image. For example, when the operator wants the printer to perform N-up printing, he inputs the setting information that specifies N-up printing. By means of the printing setting dialog screen, the printer driver drives the displaying section to display the printing image preview image in N-up form.

The operator looks at the preview image to check the input setting information. Upon checking that the input setting information is appropriate, the operator commands the information processing apparatus to perform printing.

In response to the command, the information processing apparatus generates plot data of data including characters, graphics, and tables, then produces print data based on the plot data, and finally sends the print data to the printer. In this manner, the information processing apparatus drives the printer to print images.

To support a variety of functions of the printer driver, the conventional information processing apparatus is often configured to display the printing setting dialog screen on the display unit, the printing setting dialog screen including a plurality of tab sheets having corresponding tabs. Each tab sheet has a preview screen that displays the setting information about the printer driver that has been inputted through that tab sheet, so that the operator is informed of the actual setting information about the printer driver inputted through that tab sheet.

The setting information about the printer driver is input on a tab sheet basis, and is therefore displayed on a tab sheet basis. Thus, when the operator is seeing a tab sheet, he has difficulty in obtaining the setting information input through other tab sheets.

For example, when the printing setting dialog screen is constituted of a plurality of tab sheets, a preview image unique to each tab sheet is displayed in a preview screen of the printing setting dialog screen, the preview image representing the setting information about the printer driver.

As described above, different tab sheets show different preview images. Therefore, when the operator wants to know the setting information that has been input through a tab sheet, the operator needs to open that tab sheet.

This causes inconvenience to the operator.

SUMMARY OF THE INVENTION

The present invention was made in view of the aforementioned drawbacks.

An object of the invention is to provide an information processing apparatus and programs that implement the information processing apparatus.

Another object of the invention is to provide an information processing apparatus and a method for efficiently informing the operator of the setting information that has been input through different tab sheets.

Yet another object of the invention is to provide a method for implementing the image processing apparatus.

An information processing apparatus connected to a printer includes dialog screen producing section, a common preview producing section, and a display section. The dialog screen producing section is configured to produce a dialog screen that includes a plurality of tab sheets. The tab sheets prompt an operator to input first setting information for printing. The common preview producing section is configured to produce a common preview image that should be displayed on the dialog screen. The common preview image appears in all of the plurality of tab sheets. The display section is configured to display the dialog screen and the common preview image.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given byway of illustration only, and thus are not limiting the present invention, and wherein.

DETAILED DESCRIPTION OF THE INVENTION

Figure 1:
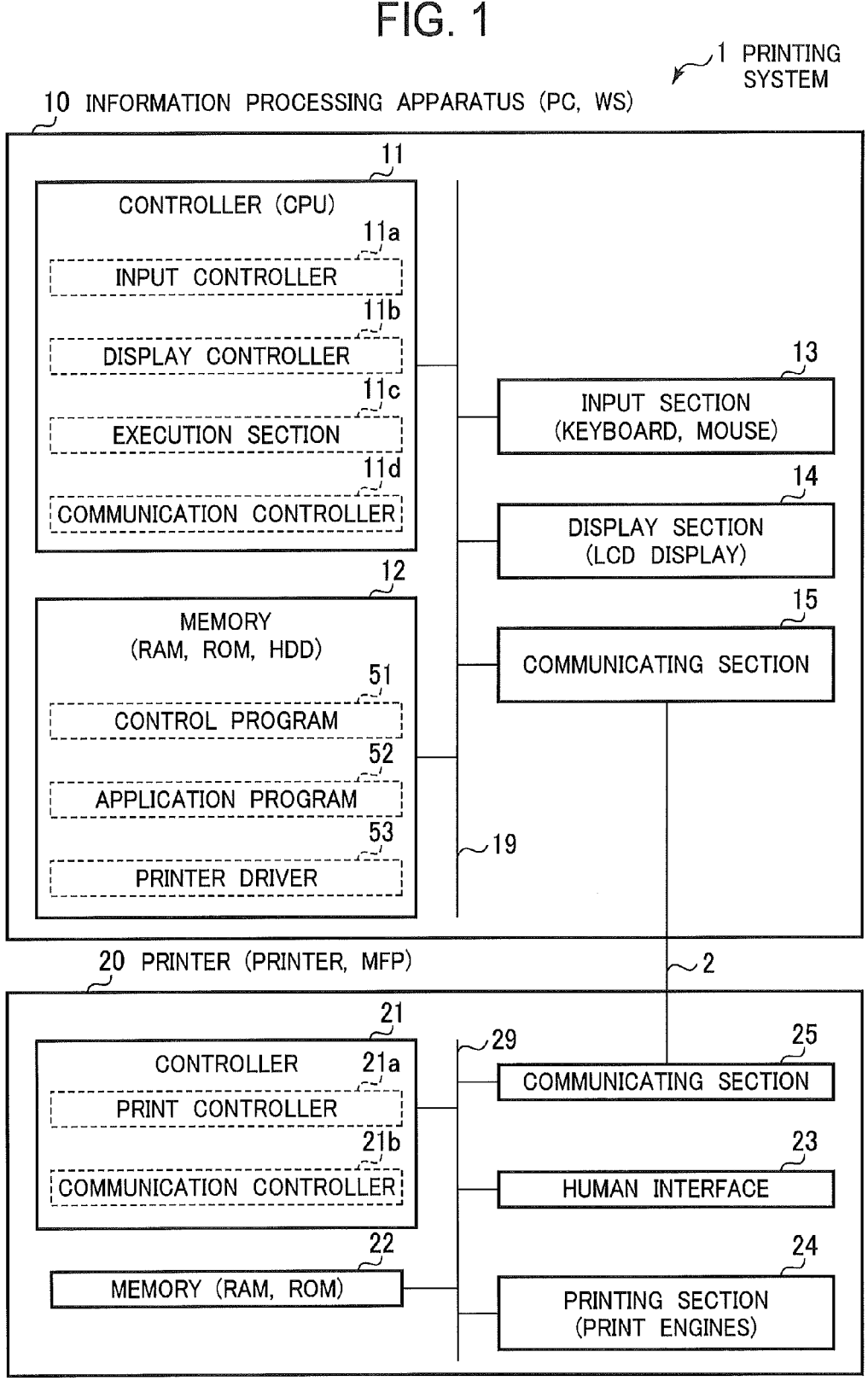
FIG. 1 illustrates the configuration of a printing system incorporating an information processing apparatus.

Embodiments of the invention will be described with reference to the accompanying drawings. The invention is not limited to these embodiments. Similar or common elements have been given like reference numerals throughout the drawings.

First Embodiment

{Configuration}

In this specification, the term "document data" refers to information such as characters in a document. The term "plot data" refers to information to be displayed on, for example, a display screen and represents which position in the display screen, for example, the character should appear. The term "print data" refers to data in which the plot data is described using a command system that can be interpreted by a printer.

Figure 2:
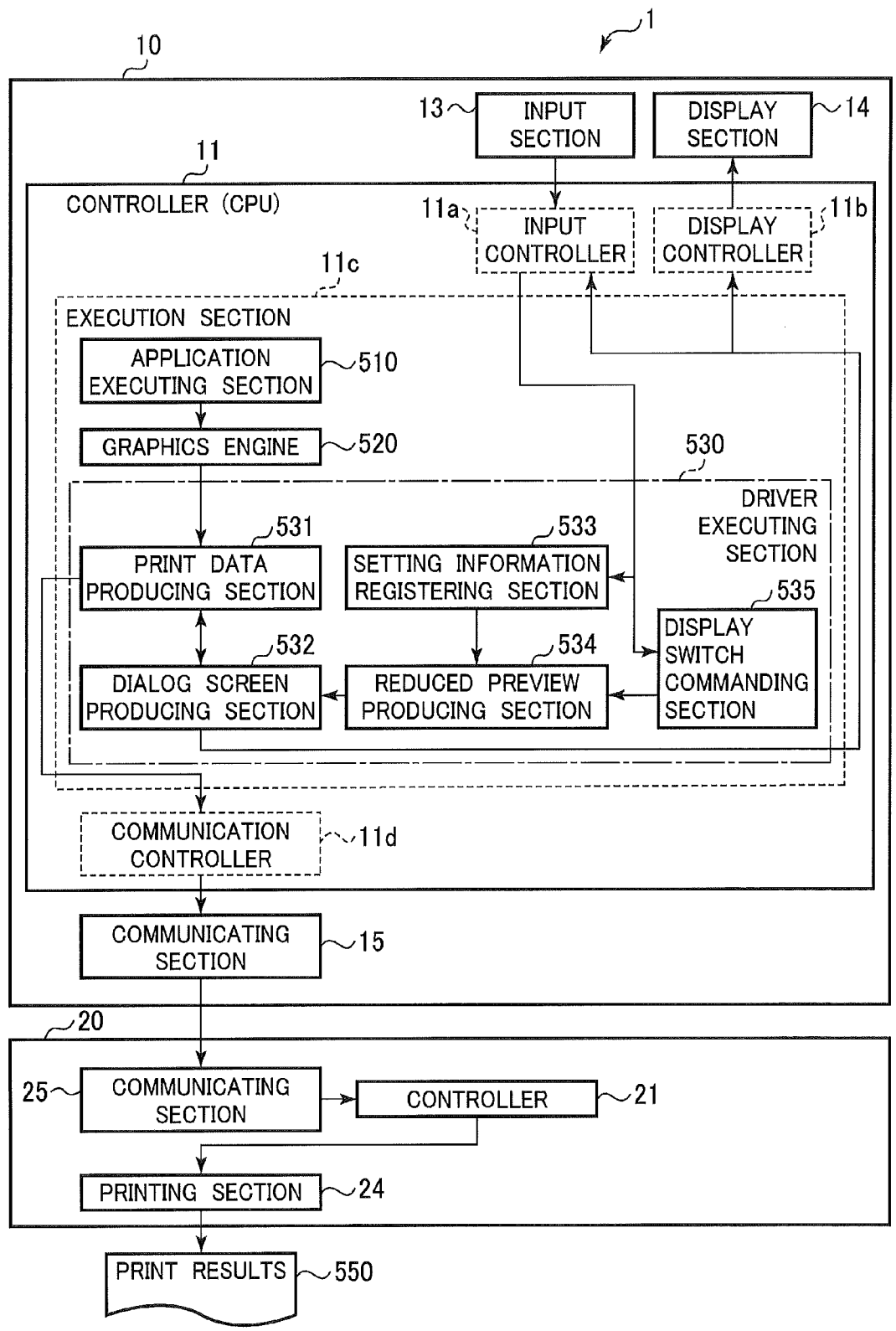
FIG. 2 illustrates the configuration of a pertinent portion of the information processing apparatus.

The configuration of an information processing apparatus 10 according to a first embodiment will be described with reference to FIGS. 1 and 2. FIG. 1 illustrates the configuration of a printing system 1 incorporating the information processing apparatus 10. FIG. 2 illustrates the configuration of a pertinent portion of the information processing apparatus 10.

Referring to FIG. 1, the information processing apparatus 10 is connected to a printer 20 through a network (e.g., LAN) or a USB cable, so that the information processing apparatus 10 can communicate with the printer 20. The information processing apparatus 10 and printer 20 constitute the printing system 1.

The information processing apparatus 10, which is a host apparatus, sends print data to the printer 20, which in turn prints the print data. The information processing apparatus 10 takes the form of a computer such as a personal computer (PC) or a work station (WS). In this specification, the information processing apparatus 10 will be described with respect to a PC.

The printer 20 takes the form of a printer or a multifunction printer (MFP), and prints an image in accordance with the print data received from the information processing apparatus 10. MFP incorporates multiple functions including facsimile function, scanner function, and copy function. The printer 20 will be described in terms of a printer.

The printer 20 includes a controller 21, a memory 22, a human interface 23, printing section 24, and a communicating section 25. The controller 21 controls the operation of a variety of sections within the printer 20. The controller 21 is implemented with a central processing unit (CPU). The controller 21 includes a printing controller 21a and a communication controller 21b. The printing controller 21a drives the printing section 24 to perform printing. The communication controller 21b controls communication with the peripheral apparatus, e.g., information processing apparatus 10. The memory 22 stores a variety of items of data and programs used in a printing operation. The memory 22 takes the form of a RAM and/or a ROM. The human interface 23 receives a variety of commands from the operator. The printing section 24 includes print engines. The communicating section 25 communicates with peripheral apparatus, e.g., information processing apparatus 10.

The information processing apparatus 10 includes a controller 11, a memory 12, an input section 13, a display section 14, and a communicating section 15. The controller 11 takes the form of a CPU, and controls the operation of a variety of sections within the information processing apparatus 10. The memory 12 stores a variety of programs and data used in a printing operation. The memory 12 takes the form of a RAM and/or a ROM. The input section 13 takes the form of a keyboard and/or a mouse, and receives a variety of items of information from the operator. The display section 14 takes the form of an LCD and/or an LED. The communicating section 15 communicates with peripheral apparatus (e.g., printer 20).

The memory 12 stores a control program 51, an application program 52, and a printer driver 53. The control program 51 is an OS program that runs on the CPU, and performs functions including an inputting controller 11a, a display controller 11b, an execution section 11c, and a communication controller 11d. The application program 52 is used for creating and editing "document data" including document files, graphics, and tables. The printer driver 53 controls the printing operation of the printer 20.

The inputting controller 11a receives a variety of setting information about the printer driver from the operator through the input section 13, or detects the position of a mouse when the mouse is clicked. In this specification, the function of printer driver is referred to as a "driver function," and a variety of items of setting information is referred to as "setting information about the driver function." The inputting controller 11a detects when the operator operates the input section 13, thereby obtaining a variety of items of information (e.g., setting information about the driver function and information generated by clicking the mouse) from the operator.

The display controller 11b drives the display section 14 to display a variety of images. The execution section 11c executes the application program 52 and printer driver 53. The communication controller 11d controls the communication between the image processing apparatus 10 and the external apparatus, e.g., printer 20.

The configuration of a pertinent portion of the information processing apparatus 10 will be described. Referring to FIG. 2, the execution section 11c includes an application executing section 510, a graphics engine 520, and a driver executing section 530.

The application executing section 510 executes the application program 52 to create and edit data including characters, graphics, and tables. The application executing section 510 creates plot data representative of document data containing characters, graphics, and tables to be printed, so that the printer 20 can print the image of the characters, graphics, and tables on paper. The application executing section 510 provides the produced plot data to the graphics engine 520.

The graphics engine 520 converts the plot data created by the application program 52 into an image format with which the printer driver 52 can work. The graphics engine 520 provides the converted plot data to the driver executing section 530.

The driver executing section 530 executes the printer driver 53, and produces print data, which can be interpreted by the printer 20, in accordance with the plot data outputted from the graphics engine 520. The driver executing section 530 drives the communication controller 11d to send the print data to the printer 20 through the communicating section 15.

The driver executing section 530 includes a print data producing section 531, a dialog screen producing section 532, a setting information registering section 533, a reduced preview producing section 534, and a display switch commanding section 535.

The print data producing section 531 produces the print data, which can be interpreted by the printer 20, based on the plot data received from the graphics engine 520.

The print data producing section 531 obtains the plot data, converted into a predetermined image format, from the graphics engine 520, and obtains the setting information about the driver function from the dialog screen producing section 532. The print data producing section 531 then produces the print data based on the plot data and the setting information about the driver function that has been registered with the memory 12. The print data producing section 531 outputs the produced print data to the communication controller 11d, which in turn drives the communicating section 15 to send the print data to the printer 20.

The dialog screen producing section 532 produces a dialog screen which is a user interface screen for a printer driver 53. In the first embodiment, it is assumed that the dialog screen producing section 532 produces a print setting dialog screen shown in FIGS. 3A-3D (hereinafter dialog screen D1) through which the operator inputs the setting information for the driver function.

The dialog screen producing section 532 provides the screen information about the thus produced dialog screen D1 to the display the controller 11b. In response to this, the display controller 11b drives the display section 14 to display the dialog screen D1. As is clear from FIGS. 3A-3D, the dialog screen D1 includes a plurality of sheets (hereinafter table sheets) having corresponding tabs. The operator inputs the setting information about the driver function into each tab sheet.

The dialog screen producing section 532 obtains a common preview image PR1 (FIGS. 3A-3D) from the reduced preview producing section 534, and incorporates the common preview image PR1 into a common preview screen 1001 (FIGS. 3A-3D) on the dialog screen D1. The common preview screen 1001 will be described later. In this manner, the dialog screen producing section 532 drives the dialog screen D1 so that the common preview image PR1 appears in main tab sheets, preferably in all tab sheets.

The setting information registering section 533 registers the setting information about the driver function with the memory 12 (FIG. 1), the setting information being inputted by the operator through a tab sheet in the dialog screen D1.

When the operator operates the input section 13 to input information, the setting information registering section 533 obtains the input information, e.g., setting information about the driver function and the information generated by clicking the mouse, from the inputting controller 11a. If the obtained input information contains the setting information about the driver function, the setting information registering section 533 registers the setting information about the driver function with the memory 12.

The reduced preview producing section 534 produces a reduced preview screen (hereinafter reduced image) to be displayed on the dialog screen D1. The reduced preview producing section 534 reduces a template image (FIGS. 4A and 4B) prepared in advance, thus producing a reduced image.

The reduced preview producing section 534 also produces a preview image (hereinafter main image) having a larger size than the reduced image on the dialog screen D1.

The reduced preview producing section 534 serves as a common preview producing section. When the setting information about the driver function is input through a tab sheet, the common preview producing section produces the common preview image PR1 (FIGS. 3A-3D) which appears the main tab sheets, preferably all of the tab sheets, based on the input setting information.

The reduced preview producing section 534 produces a preview image (hereinafter apparatus preview image) representative of the information about the printer 20, including the configuration and functions of the printer and the size of trays used for printing. The reduced preview producing section 534 also produces a preview image (hereinafter print image preview image). One of the apparatus preview image and the printing image preview image is selected as being a main image, and the other of the apparatus preview image and printing image preview image is reduced into a reduced image smaller than the main image. The main image and reduced image are positioned simultaneously at predetermined positions, thereby producing the common preview image PR1 (FIG. 3A-3D).

The reduced preview producing section 534 outputs the thus produced common preview image PR1 to the dialog screen producing section 532, which in turn incorporates the common preview image PR1 into a common preview screen 1001 on the dialog screen D1, so that the common preview image appears on the dialog screen D1 throughout the main tab sheets, preferably all of the tab sheets. The first embodiment assumes that the dialog screen producing section 532 displays the common preview image PR1 in all the tab sheets on the dialog screen D1.

In the first embodiment, the reduced preview producing section 534 serves as a common preview producing section.

However, the information processing apparatus 10 may be configured such that the dialog screen producing section 532 serves as a common preview producing section, in which case the information processing apparatus 10 is configured so that the reduced preview producing section 534 provides the main image and reduced image to the dialog screen producing section 532 and the dialog screen producing section 532 in turn incorporates the main image and reduced image into the common preview screen 1001, thereby producing the common preview image PR1.

When the operator operates the input section 13 to switch between the main image and the reduced image, the display switch commanding section 535 outputs a switching command to the reduced preview producing section 534.

In this manner, the main image may be switched to the reduced image and the reduced image is switched to the main image.

The display switch commanding section 535 obtains information inputted from the inputting controller 11a, for example, the setting information about the driver function and information generated by clicking the mouse.

When the obtained input information specifies the reduced image, the display switch commanding section 535 determines that the operator commanded to switch between the main image and reduced image. The display switch commanding section 535 then outputs the switching command to the reduced preview producing section 534.

In response to the switching command, the reduced preview producing section 534 produces a main image based on the currently displayed reduced image and a reduced image based on the currently displayed main image. The reduced preview producing section 534 then produces an update common preview image PR1 in which the main image and the reduced image are positioned simultaneously at predetermined positions. The reduced preview producing section 534 then provides the produced update common preview image PR1 to the dialog screen producing section 532.

Figure 3A:
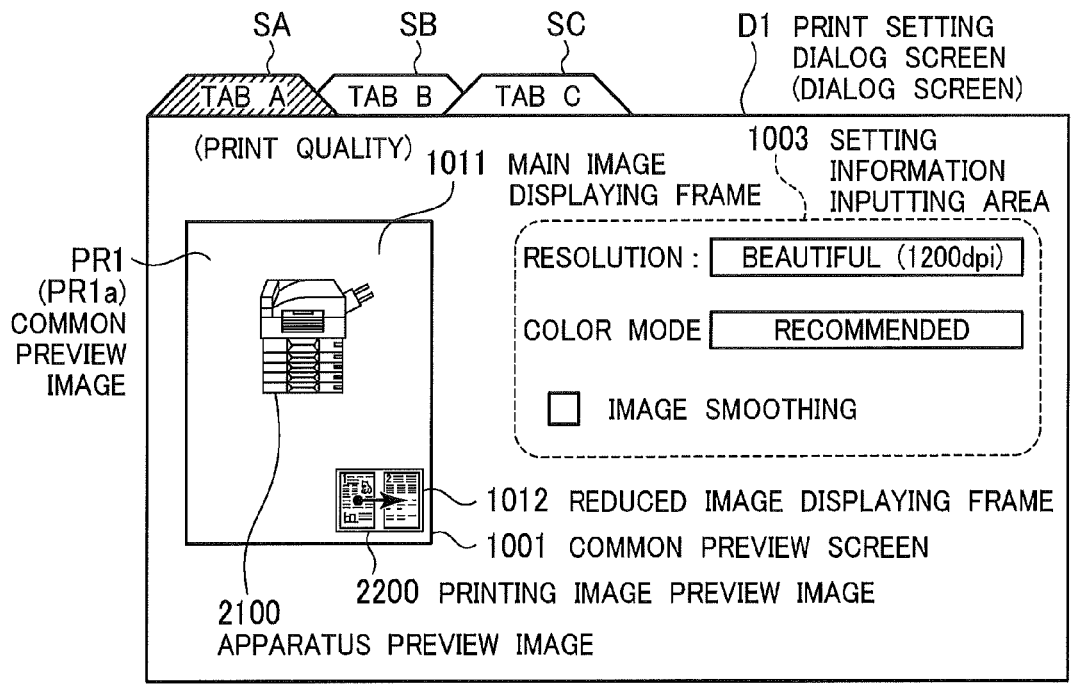
FIGS. 3A-3D illustrate an example of the printing setting dialog screen.
Figure 3B:
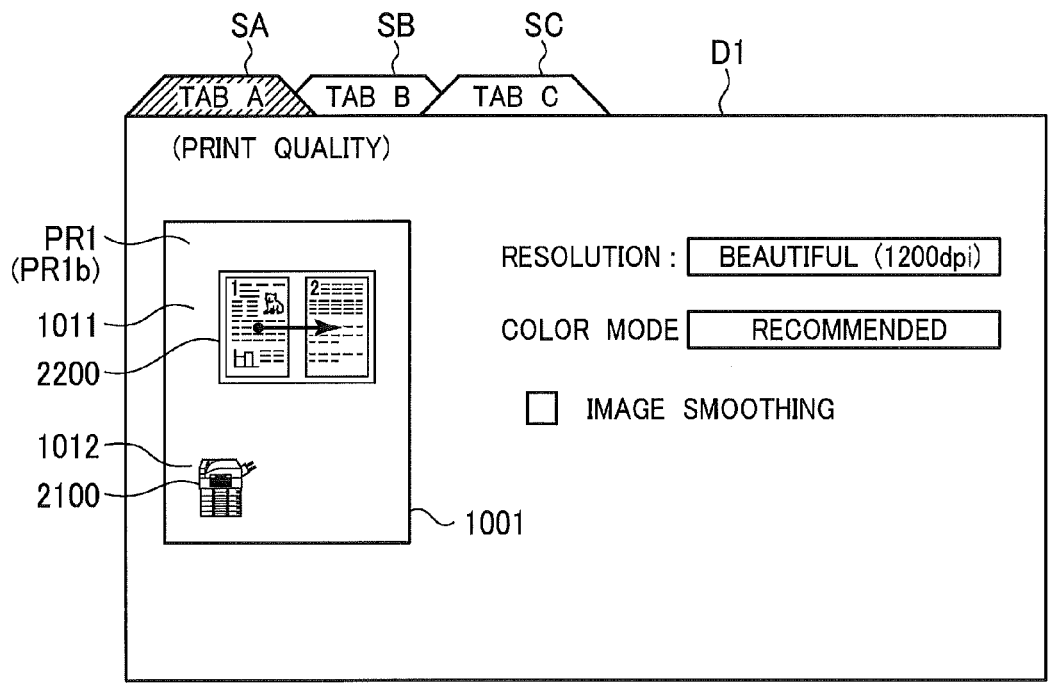

Upon reception of the common preview image PR1, the dialog screen producing section 532 switches the current common preview image PR1 (e.g., common preview image PR1a shown in FIG. 3A) to a new common preview image PR1 (e.g., the common preview image PR1b shown in FIG. 3B).

{Example of Printing Setting Dialog Screen}

FIGS. 3A-3D illustrate an example of the printing setting dialog screen. An example of the printing setting dialog screen according to the first embodiment will be described with reference to FIGS. 3A-3D. The dialog screen producing section 532 produces the printing setting dialog screen, e.g., dialog screen D1 as shown in FIGS. 3A-3D.

As described above, the dialog screen D1 has a plurality of tab sheets, each having a corresponding tab. Referring to FIG. 3A-3D, the dialog screen D1 includes a tab sheet SA to which a tab A is assigned, a tab sheet SB to which a tab B is assigned, and a tab sheet SC to which a tab C is assigned.

Figure 3C:
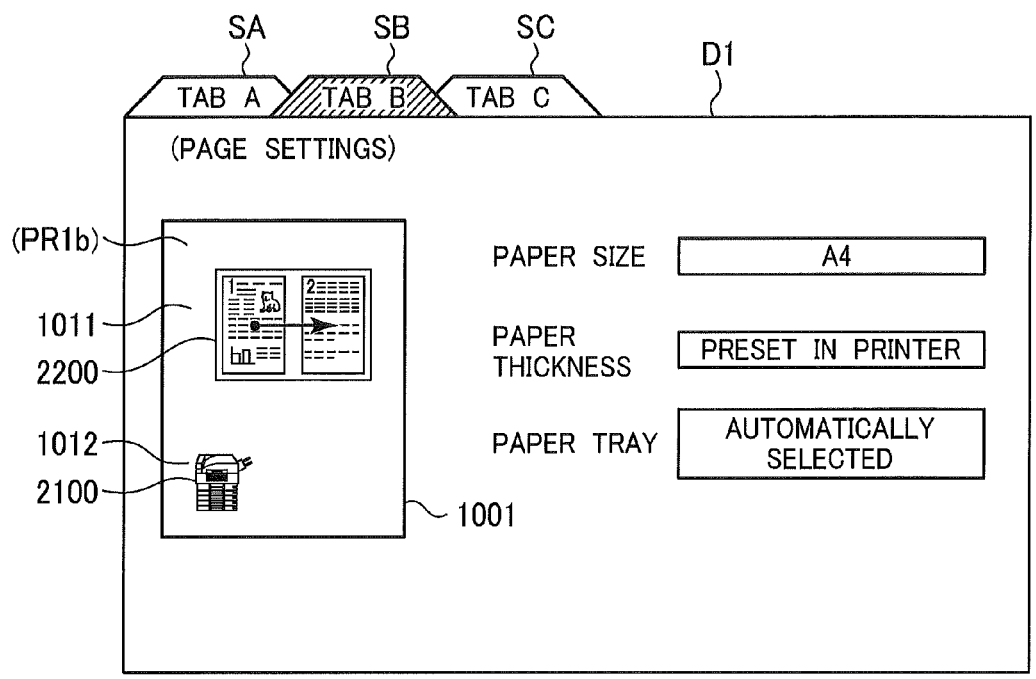
Figure 3D:
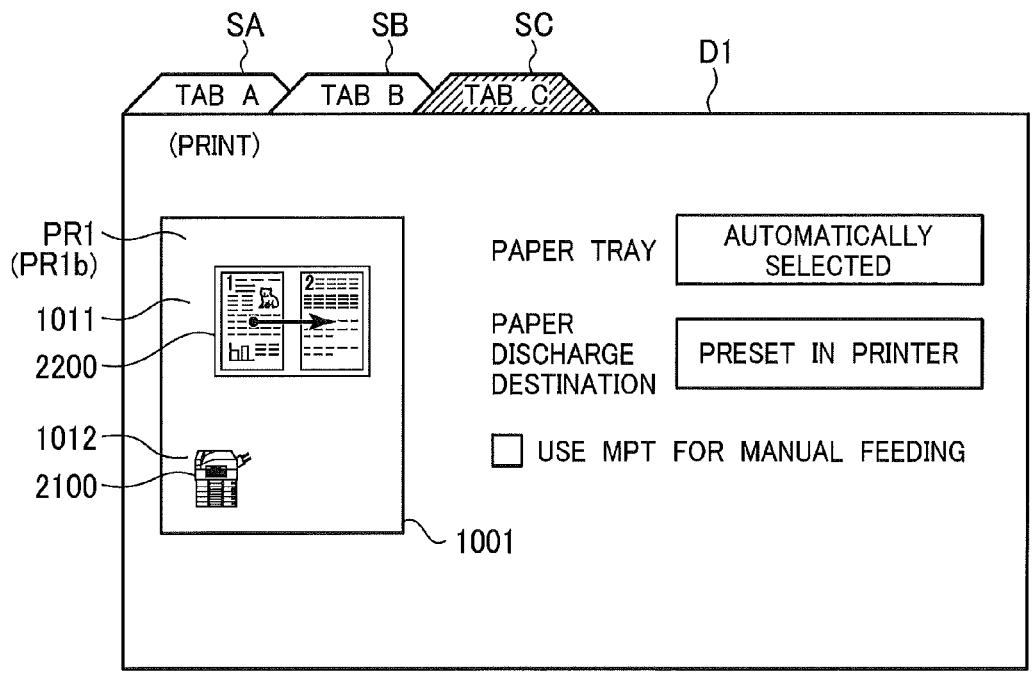

The operator inputs the setting information about the drive function used for printing into tab sheets SA, SB, and SC. The tab sheet SA receives the setting information about "print quality" (FIGS. 3A-3B). The tab sheet SB receives the setting information about the "page setting" (FIG. 3C). The tab sheet SC receives the setting information about "paper feeding" (FIG. 3D).

The dialog screen D1 includes a common preview screen 1001 and a setting information inputting area 1003. The common preview screen 1001 displays the common preview image PR1. The common preview image PR1 shows the setting information, inputted into the setting information inputting area 1003, to the operator in an easy-to-understand way. The common preview image PR1 appears in all of the tab sheets SA, SB, and SC.

The setting information inputting area 1003 takes the form of a radio button, a combo box, a check box, or a text box, and receives the setting information about the driver function from the operator.

The operator inputs the setting information through the setting information inputting area 1003 on the dialog screen D1. The operator can also refer to the common preview image PR1 displayed in the common preview screen 1001 on the dialog screen D1, thereby checking the setting information inputted by the operator.

In the first embodiment, the common preview screen 1001 is configured to display a plurality of preview images in different sizes. Specifically, the common preview screen 1001 includes a main image displaying frame 1011 that displays the main image and a reduced image displaying frame 1012 that displays the reduced image. The main image and reduced image are positioned simultaneously at predetermined positions in the common preview PR1.

FIG. 3A illustrates the common preview image PR1a as an example of the common preview image PRI where an apparatus preview image 2100 is a main image and a printing image preview image 2200 is a reduced image. FIG. 3A illustrates the tab sheet SA on the dialog screen D1.

Figure 4A:
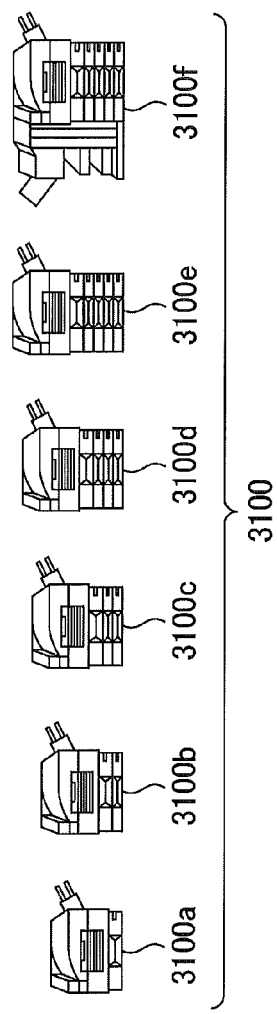
FIG. 4A illustrates an example of an apparatus template.
Figure 4B:
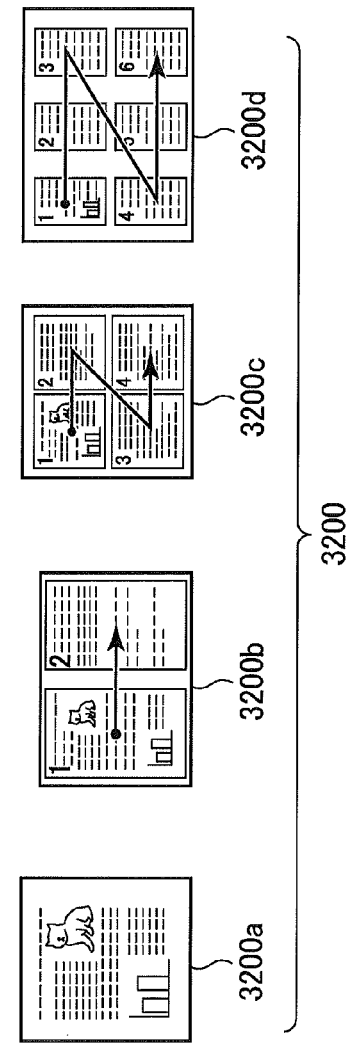
FIG. 4B illustrates an example of a printing image template.

The main image and reduced image are produced from corresponding templates. FIG. 4A illustrates an example of an apparatus template, and FIG. 4B illustrates an example of a printing image template.

The template images are previously produced based on the setting information about the driver function, and are stored in the memory 12. FIG. 4A illustrates six types of printing image templates 3100a-3100f prepared as apparatus image templates 3100, and stored in the memory 12. FIG. 4B illustrates four types of printing image templates 3200a-3200d prepared as printing image templates 3200, and stored in the memory 12.

Suppose the reduced preview producing section 534 produces the common preview image PR1a (FIG. 3A) as the common preview image PR1, the common preview image PR1a having the apparatus preview image 2100 as a main image and the printing image template 2200 as a reduced image.

An apparatus template 3100 corresponds to the setting information about a predetermined driver function. The reduced preview producing section 534 (FIG. 2) selects one of the apparatus templates 3100a-3100f. The selected apparatus template represents the setting information about the driver function representative of the configuration and functions of the printer 20, which is the initial information or information inputted by the operator.

Also, a printing image template 3200 corresponds to the setting information about a predetermined driver function. The reduced preview producing section 534 (FIG. 2) selects one of the printing image templates 3200a-3200d. The selected printing image template represents the setting information about the driver function, including simplex printing, duplex printing, an N-up printing of the printer 20. These items of information are the initial information stored in advance or the information inputted by the operator. The initial setting information is registered with the memory 12 in advance. The setting information inputted by the operator is registered by the setting information registering section 533 with the memory 12.

The reduced preview producing section 534 reduces the selected printing image template 3200 to the size of a reduced image.

The reduced preview producing section 534 positions the selected apparatus templates 3100 in the main image displaying frame 1011, and the selected printing image template 3200 as a reduced image in the reduced image displaying frame 1012, thereby producing the common preview image PR1a (FIG. 3A).

The reduced preview producing section 534 outputs the thus produced common preview image PR1a to the dialog screen producing section 532. Upon reception of the common preview image PR1a, the dialog screen producing section 532 incorporates the common preview image PR1 into the common preview 1001 (FIGS. 3A-3D) of the dialog screen D1, so that the produced common preview image PR1 appears in all of the tab sheets SA, SB, and SC on the dialog screen D1.

When the operator wants to enlarge the reduce image displayed in the reduced image displaying frame 1012 (FIGS. 3A-3D) on the dialog screen D1, the operator operates the mouse to click the reduced image, so that the main image appearing in the main image displaying frame and the reduced image appearing in the reduced image displaying frame 1012 are swapped. In the specification, clicking the reduced image causes swapping the main image and the reduced image.

FIG. 3B illustrates the configuration of the dialog screen D1 shortly after the operator clicked the reduced image shown in FIG. 3A. It is to be noted that the common preview image PR1 has been switched from the common preview image PR1a to the common preview image PR1b. The common preview image PR1a has the apparatus preview image 2100 as a main image and the printing image template 3200 as a reduced image. The common preview image PR1b has the printing image template 3200 as a main image and the apparatus preview image 2100 as a reduced image.

When the operator wants to see other tab sheets than currently displayed tab sheets, he operates the mouse as the input section 13 (FIG. 1) to click a desired tab so that the desired tab sheet appears on the dialog screen D1. In the specification, clicking a desired tab causes a corresponding tab sheet to appear on the dialog screen D1.

FIG. 3C illustrates the dialog screen D1 after the operator clicked the tab B shown in FIG. 3A. FIG. 3C illustrates the tab sheet SB appearing on the dialog screen D1.

FIG. 3D illustrates the dialog screen D1 after the operator clicked the tab C shown in FIG. 3A. FIG. 3D illustrates the tab sheet SC on the dialog screen D1.

As shown in FIGS. 3B-3D, the common preview image PR1 (here, common preview image PR1b) appears in all of the tab sheets SA, SB, and SC displayed on the dialog screen D1.

The information processing apparatus 10 is configured such that the operator clicks a part of the main image to modify a part of the setting information about the driver function. In the specification, this function is referred to as main image clicking function.

Suppose that the operator clicks the apparatus preview image 2100 in the reduced image displaying frame 1012 of the tab sheet SB shown in FIG. 3C in order to make the apparatus preview image 2100 appear as a main image on the main image displaying frame 1011. In the first embodiment, the tab sheet SB is used for setting pages, and the tab sheet SC is used for feeding paper.

The operator then clicks the "$2^{nd}$ tray (the $2^{nd}$ tray from the top)" on the apparatus preview image 2100 displayed as a main image within the main image displaying frame 1011 of the tab sheet SB, in which case the setting information in the "feeding tray" that appears in the tab sheet SC on the dialog screen D1 (FIG. 3D) may be changed automatically to "$2^{nd}$ tray."

However, the information processing apparatus 10 is configured such that the operator is allowed to change only the items of setting information on the currently opened tab sheet that are permitted to change. In other words, when the operator clicks a part of the main image, the operator is unable to change the item of setting information if the item of setting information is not permitted to change. This configuration minimizes unnecessary confusion when the operator changes the setting information.

The items of setting information on the currently opened tab sheet that are permitted to change are those displayed on the currently opened tab sheet. For example, the "paper size," "paper thickness," and "feeding tray" on the tab sheet SB shown in FIG. 3C are permitted to change in the currently opened tab sheet, and are referred to as "permitted items" in this specification.

The information processing apparatus 10 is configured such that the operator clicks a part of the apparatus preview image 2100 appearing in the main image, and that if the clicked area contains the permitted items, the operator is allowed to change the setting information about the driver function that appears in the clicked area. Therefore, the information processing apparatus 10 allows the operator to change the setting information via the currently opened tab sheet without having to open a tab sheet through which the setting information about the driver function was input.

This function of modifying the setting information is implemented by the inputting controller 11a, the setting information registering section 533, and dialog screen producing section 532, which operate as follows:

The inputting controller 11a obtains the screen information about the dialog screen D1 from the dialog screen producing section 32, and detects the clicked area on the dialog screen D1 when the operator clicks the mouse.

The inputting controller 11a checks the dialog screen D1 to determine whether the clicked area is an area of the permitted items. If the clicked area is an area of the permitted items, the inputting controller 11a identifies an item of setting information based on the screen information about the dialog screen D1, and outputs the identified item of setting information to the setting information registering section 533.

Upon reception of the identified item of setting information, the setting information registering section 533 registers the identified item of setting information with the memory 12, the identified item of setting information being as the setting information about the driver function. The dialog screen producing section 532 then produces the dialog screen D1 based on the setting information about the driver function registered with the memory 12. The dialog screen producing section 532 then outputs the screen information of the dialog screen D1 to the display controller 11b, which in turn drives the display section 14 to display the dialog screen D1. In this manner, the dialog screen producing section 532 changes the setting information, implementing the main image clicking function.

As described above, the inputting controller 11a makes a decision to determine whether the setting information is permitted to change. Alternatively, the setting information registering section 533 may obtain from the inputting controller 11a the positional information indicative of the area where the mouse was clicked, and obtains the screen information about the dialog screen D1 from the dialog screen producing section 532, thereby making a decision based on the information about the clicked area and the screen information on the dialog screen D1 to determine whether the setting information is permitted to change.

If the operator clicked the "2$^{nd}$ tray" of the apparatus preview image 2100 displayed as a main image of the main image displaying frame 1011 through the tab sheet SA (FIG. 3A), the information processing apparatus 10 displays the tab sheet SC for feeding paper on the dialog screen D1. In this manner, the information processing apparatus 10 permits the operator to change the setting information about the paper tray through the tab sheet SC for feeding paper. This function is referred to as an exclusive tab sheet function in this specification.

This function is implemented by the inputting controller 11a, the setting information registering section 533, and the dialog screen producing section 532, which operate as follows: The information processing apparatus 10 is assumed that the inputting controller 11a outputs a signal commanding to switch the tab sheets to the dialog screen producing section 532.

The inputting controller 11a obtains the screen information about the dialog screen D1 from the dialog screen producing section 532, and identifies the position or area on the dialog screen D1 clicked by the operator.

Next, the inputting controller 11a makes a decision based on the screen information of the dialog screen D1 to determine whether the clicked area is an area where the information is permitted to change. If the clicked area contains the information permitted to change, the main image clicking function is performed, i.e., the information corresponding to the clicked area is changed. If the clicked area does not contain the information permitted to change, the information processing apparatus 10 performs the exclusive tab sheet function.

If the clicked area does not contain the information permitted to change, the inputting controller 11a identifies, based on the screen information of the dialog screen D1, the information that corresponds to the area clicked by the mouse, and then identifies an exclusive tab sheet through which the identified information should be inputted. The inputting controller 11a then outputs a tab sheet display switching signal to the dialog screen producing section 532, so that the identified tab sheet (e.g., tab sheet SC shown in FIG. 3D) appears on the dialog screen D1.

Upon reception of the tab sheet display switching signal, the dialog screen producing section 532 produces the dialog screen D1 with the identified tab sheet appearing on top. The dialog screen producing section 532 outputs the screen information of the dialog screen D1 to the display controller 11b, which in turn drives the display unit 14 to display the dialog screen D1. In this manner, the exclusive tab sheet function is implemented.

{Major Features of Printing Setting Dialog Screen}

(1) The information processing apparatus 10 does not produce different preview images for different tab sheets but produces a single common preview image PR1. The common preview image PR1 appears in all of the tab sheets SA, SB, and SC.

When one of the tab sheets SA, AB, and SC is opened, the reduced preview producing section 534 executes a later described common preview screen displaying process (S125a, S125b, and S125c in FIG. 5 or S125 in FIG. 6) for all the tab sheets, thereby producing the common preview image PR1.

As a result, a single common preview image PR1 may be shared by all of the tab sheets SA, AB, and SC. Therefore, the information processing apparatus 10 has only a single processing section, i.e., the reduced preview producing section 534.

(2) The main image is positioned in the main image displaying frame 1011 and the reduced image is positioned in the reduce image displaying frame 1012, thereby producing the common preview image PR1.

(3) The information processing apparatus 10 performs the aforementioned main image clicking function. Thus, the operator is allowed to change the setting information about the driver function through any one of the tab sheets without having to open a tab sheet through which the setting information about the driver function was originally inputted. In this manner, the information processing apparatus 10 performs the main image clicking function, simplifying the changing of the setting information about the drive function.

(4) The information processing apparatus 10 performs the main image clicking function only on the permitted items, and does not perform the main image clicking function on the non-permitted items. In this manner, the information processing apparatus 10 minimizes unnecessary confusion during changing of the setting information.

(5) The information processing apparatus 10 performs the exclusive tab sheet function, so that the operator is able to automatically open an exclusive tab sheet without having to look for the exclusive tab sheet through which the setting information about the driver function was inputted. Thus, the exclusive tab sheet function simplifies the procedure for changing the setting information about the driver function.

{Summary of Operation of Information Processing Apparatus}

The operator activates the application program 52 so that the application executing section 510 produces and/or edits data including characters, graphics, and tables. When the operator operates the input section 13 to call the printer driver 53 so that the printer 20 prints data including characters, graphics, and tables, and the dialog screen producing section 532 produces the dialog screen D1 (FIGS. 3A-3D) and then outputs the screen information about the produced dialog screen D1 to the display controller 11b. The display controller 11b then drives the display section 14 to display the dialog screen D1.

At this time, if the memory 12 holds the setting information about the driver function inputted by the operator, then the reduced preview producing section 534 produces the common preview image PR1 (FIGS. 3A-3D) based on the setting information. If the memory 12 does not hold the setting information about the driver function inputted by the operator, then the reduced preview producing section 534 produces the common preview image PR1 (FIGS. 3A-3D) based on the initial setting information.

The reduced preview producing section 534 outputs the produced image information about the common preview image PR1 to the dialog screen producing section 532. The dialog screen producing section 532 incorporates the received common preview image PR1 into the common preview screen 1001 of the dialog screen D1, and then outputs the screen information about the dialog screen D1 to the display controller 11b. The display controller 11b drives the display section 14 to display the dialog screen D1 in which the common preview image PR1 appears in all of the tab sheets.

The operator selects a desired item of setting information from among a variety of items of setting information about the driver function that appear in the dialog screen D1, and then inputs the selected item of setting information through the input section 13. The setting information registering section 533 registers the inputted setting information about the driver function with the memory 12, and also outputs the inputted setting information about the driver function to the reduced preview producing section 534.

Upon reception of the setting information about the driver function, the reduced preview producing section 534 produces the common preview image PR1 (FIGS. 3A-3D) based on the setting information about the driver function, and then outputs the image information about the produced common preview image PR1 to the dialog screen producing section 532.

Upon reception of the image information of the common preview image PR1, the dialog screen producing section 532 incorporates the common preview image PR1 into the common preview screen 1001 of the dialog screen D1, and then outputs the screen information about the dialog screen D1 to the display controller 11b. The display controller 11b then drives the display section 14 to display the dialog screen D1 in which the common preview image PR1 appears in all tab sheets.

When the operator wants to expand the reduced image appearing in the reduced image displaying frame 1012 (FIGS. 3A-3D) on the dialog screen D1, he first operates the mouse to click the reduced image. In response to the click, the display switch commanding section 535 outputs the switching command, which commands to switch between the main image and the reduced image, to the reduced preview producing section 534. In response to the command, the reduced preview producing section 534 produces a new common preview image PR1b (FIGS. 3B-3D) in which the main image and reduced image have been swapped.

Specifically, the reduced preview producing section 534 produces a new reduced image from the main image using the template images 3100 and 3200 (FIGS. 4A and 4B), which correspond to the setting information about the driver function, registered with the memory 12 by the setting information registering section 533. The reduced preview producing section 534 also produces a new main image from the reduced image. In this manner, the reduced preview producing section 534 produces the common preview image PR1b (FIGS. 3B-3D) in which the new reduced image and the new main image are positioned simultaneously at predetermined positions.

The reduced preview producing section 534 outputs the image information about the produced common preview image PR1b to the dialog screen producing section 532. Upon reception of the image information about the produced common preview image PR1b, the dialog screen producing section 532 incorporates the common preview image PR1b into the common preview screen 1001 of the dialog screen D1. In this manner, the dialog screen producing section 532 produces an update dialog screen D1 in which the common preview image PR1a has been replaced by the common preview image PR1b.

The dialog screen producing section 532 outputs the screen information about the update dialog screen D1 to the display controller 11b, which in turn drives the display section 14 to display the update dialog screen D1.

The operator refers to the dialog screen D1 to determine whether printing should be performed. If the operator determines that printing should be performed, he operates the input section 13 (FIG. 1) to command the information processing apparatus 10 to display a dialog screen (not shown) that contains a print start button (not shown). The operator depresses the print start button to command the information processing apparatus 10 to print out the data including characters, graphics, and tables.

Upon reception of the command to print from the operator, the application executing section 510 produces plot data of document data including characters, graphics, and tables, and outputs the plot data to the graphics engine 520. The graphics engine 520 converts the plot data into a predetermined format, and then outputs the converted plot data to the driver executing section 530.

The print data producing section 531 produces print data based on the plot data and the setting information about the driver function registered with the memory 12, and outputs the produced print data to the communication controller 11d. The communication controller 11d then sends the print data to the printer 20 through the communicating section 15.

The printer 20 receives the print data from the information processing apparatus 10 via the communicating section 25. Upon reception of the print data, the printing controller 21a of the controller 21 (FIG. 1) drives the printing section 24 to print in accordance with the print data. In this manner, the printer 20 outputs the print results 550.

{Specific Operation of Information Processing Apparatus}

The operation of the information processing apparatus 10 has features mainly in a process for updating the dialog screen and a display switching process. The process for updating the dialog screen is performed when the dialog screen D1 displayed on the display section 14 is updated. The display switching process is performed when the main image and the reduced image displayed on the dialog screen D1 are swapped.

Figure 5:
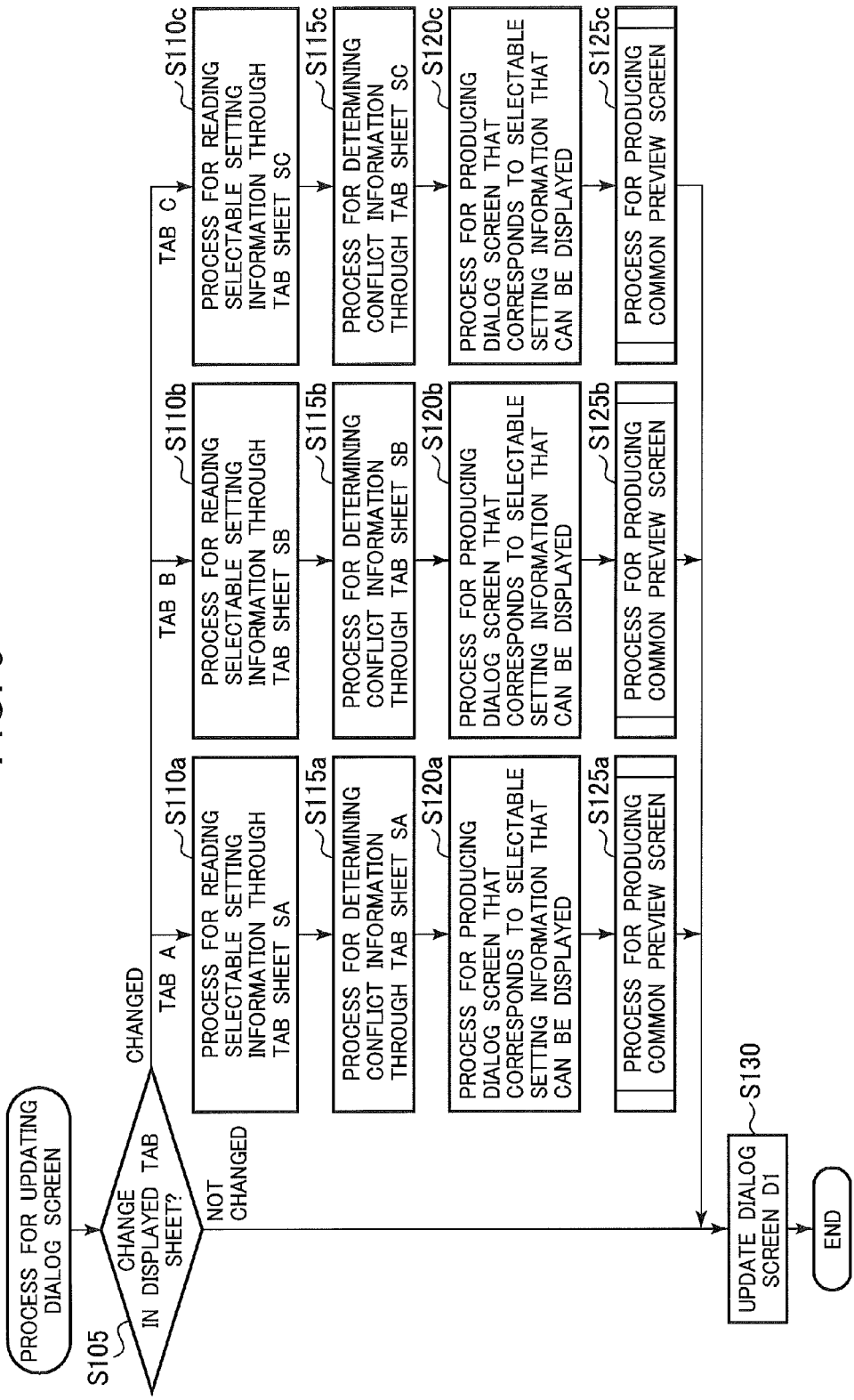
FIG. 5 illustrates the process for updating a dialog screen.
Figure 6:
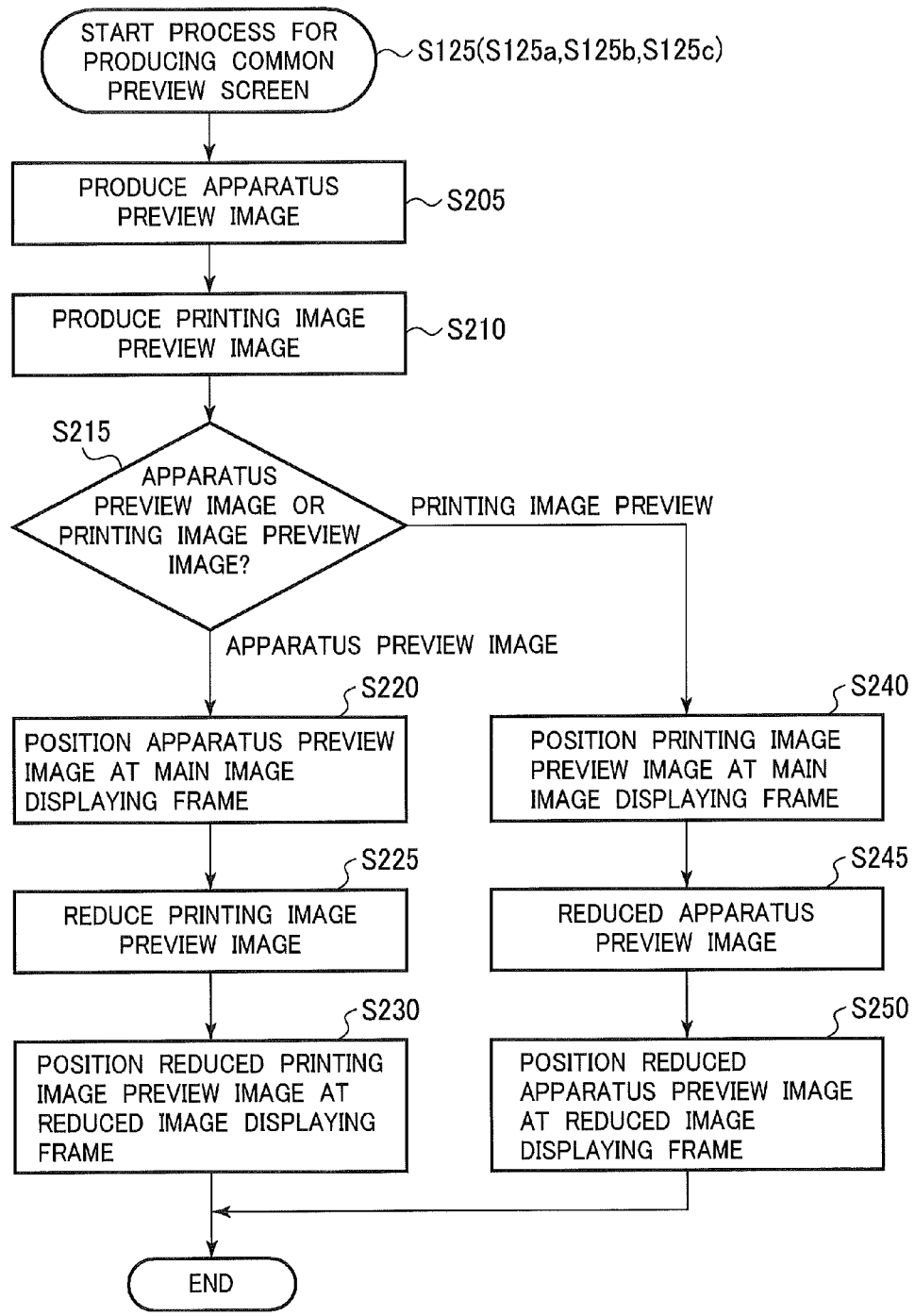
FIG. 6 illustrates the process for producing a common preview screen performed at S125a, S125b, or S125c shown in FIG. 5.
Figure 7:
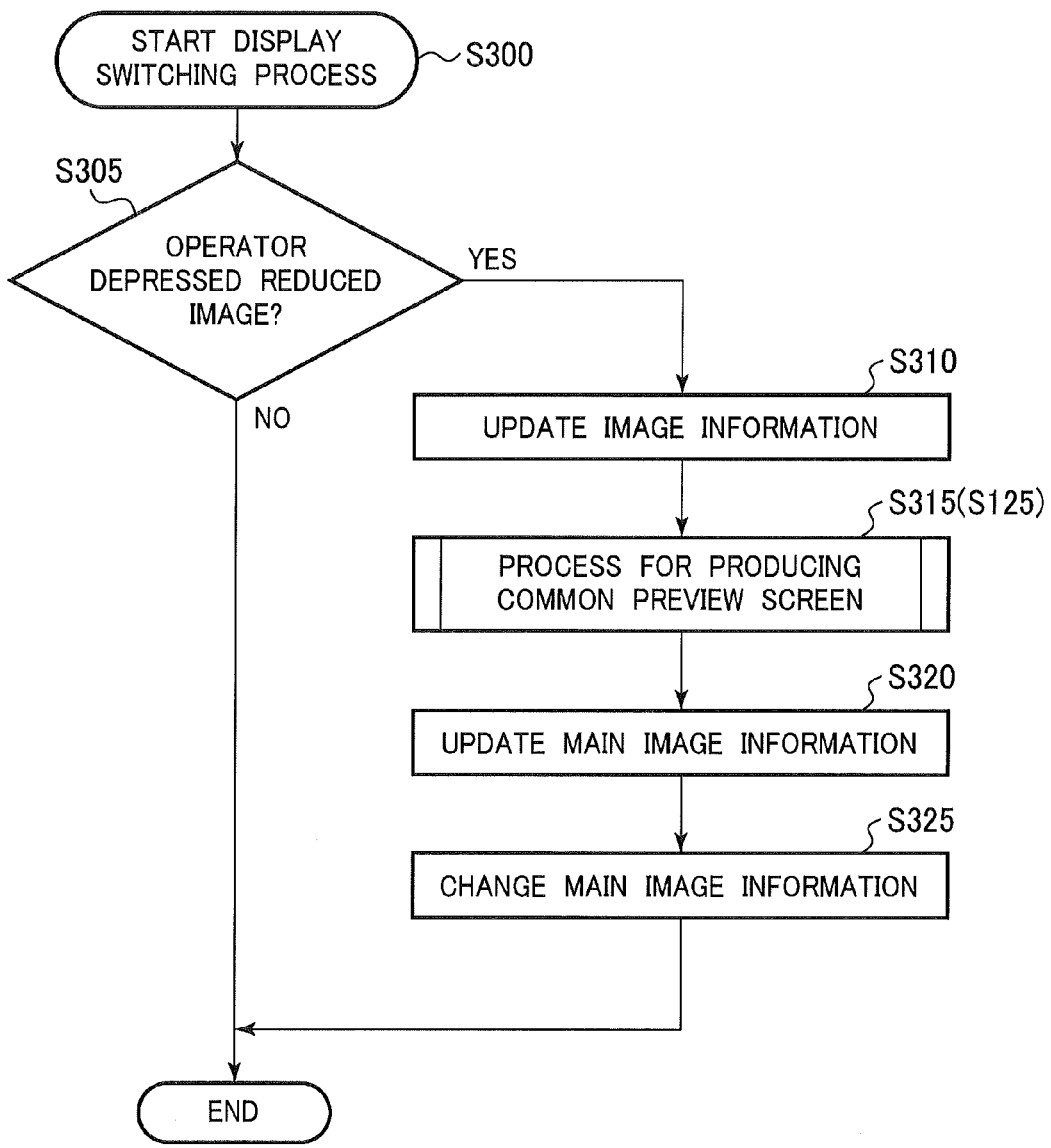
FIG. 7 illustrates a display switching process.

The operation of the information processing apparatus 10 will be described with reference to FIGS. 5-7. FIGS. 5-7 are flowcharts illustrating the operation of the information processing apparatus 10.

The control program 51 stored in the memory 12 runs on the CPU as the controller 11, and the information processing apparatus 10 operates under the control program 51. A variety of items of data are temporarily stored in the memory 12, and are output to the respective sections. These items of data processing are similar to those performed in ordinary data processing and their detailed description is omitted.

The memory 12 holds a variety of items of information: selectable setting information, i.e., information about the driver function that can be inputted through each tab sheet, conflict information that cannot be inputted through each tab sheet, and the main image information indicative of a preview image to be displayed as a main image.

The conflict information is information used for preventing an inputting area, which should not appear in the dialog screen D1, from being displayed on the dialog screen D1. The memory 12 holds the conflict information as initial setting information for the driver. For example, if the printer 20 does not support duplex printing, the conflict information prevents a certain combination of items of setting information from being displayed, if the combination may imply that duplex printing is apparently supported.

In order for the printer 20 to print the plot data including characters, graphics, and tables produced and/or edited by an application program, the operator operates the input section 13 to call the printer driver from among the application programs.

The display section 14 displays the dialog screen D1 (e.g., one of the dialog screens D1 shown in FIGS. 3A-3D) as an initial screen which is based on the initial setting information about the driver function. The initial setting information about the driver function either has been registered with the memory 12 or inputted by the operator previously.

{Process for Updating Dialog Screen}

FIG. 5 illustrates the process for updating the dialog screen.

The operator then operates the input section 13 to input new setting information about the driver function through the dialog screen D1. As a result, the information processing apparatus 10 starts the process for updating the dialog screen as shown in FIG. 5.

Referring to FIG. 5, the inputting controller 11a makes a decision to determine whether the operator has commanded to change a tab sheet displayed on the dialog screen D1 (S105).

If the operator clicks the tab A to open the tab sheet SA, steps S110a-S125a are executed. Likewise, if the operator clicks the tab B to open the tab sheet SB, steps S110b-S125b are executed. If the operator clicks the tab C to open the tab sheet SC, steps S110c-S125c are executed.

The steps S110a-S125a, S110b-S125b, and S110c-S125c are basically identical. The steps 110a-125a will be described by way of example, and the description of the steps 110b-125b and 110c-125c is omitted.

At S110a, the dialog screen producing section 532 reads the setting information about the driver function that can be selected or inputted through the tab sheet SA. The process performed at S110a is a process for reading selectable setting information through the tab sheet SA.

The dialog screen producing section 532 reads from the memory 12 the conflict information that cannot be inputted through the tab sheet SA, and makes a decision to determine whether the conflict information exists in the selectable setting information in the tab sheet SA (S115a). The process performed at S115a is a process for determining the conflict information through the tab sheet SA.

The process for determining the conflict information at S115a is a process where, for example, when the printer 20 does not support duplex printing, if a combination of items of setting information implies that duplex printing is apparently supported, the conflict information prevents that combination of setting items from being displayed.

At S115a, the dialog screen producing section 532 identifies the selectable setting information that can be displayed in the tab sheet SA. At S120a, the dialog screen producing section 532 produces an update dialog screen D1 that corresponds to the selectable setting information that can be displayed in the tab sheet SA. The process performed at S120a is a process for producing a dialog screen that corresponds to the selectable setting information that can be displayed.

At S125a, the reduced preview producing section 534 produces the common preview image PR1 based on the setting information about the driver function registered with the memory 12. Specifically, the setting information is either the initial setting information about the driver function registered with the memory 12 in advance or the setting information about the driver function registered with the memory 12 by the setting information registering section 533 if a tab sheet holds the setting information about the drive function inputted by the operator. The process performed at S125a is a process for producing a common preview screen.

{Process for Producing Common Preview Screen}

FIG. 6 illustrates in detail the process for producing a common preview screen performed at S125a, S125b, or S125c shown in FIG. 5.

As shown in FIG. 6, shortly after the reduced preview producing section 534 starts the process for producing a common preview screen at S125a, the reduced preview producing section 534 produces the apparatus preview image 2100 (S205), and also the printing image preview image 2200 (S210). At this moment, the apparatus preview image 2100 and the printing image preview image 2200 have a size for a main image (standard size).

The reduced preview producing section 534 selects an apparatus template 3100 from among the apparatus templates 3100a-3100f (FIG. 4A), and produces the apparatus preview image 2100.

The reduced preview producing section 534 selects a printing image template 3200 from among the printing image templates 3200a-3200f (FIG. 4B), and produces the printing image preview image PR1 2200.

If the setting information about the driver function inputted by the operator exists in the memory 12, a template image is selected which corresponds to the setting information about the driver function and has been registered with the memory 12 by the setting information registering section 533. If the setting information about the driver function inputted by the operator does not exist in the memory 12, a template image is selected which corresponds to the setting information about the driver function and has been registered with the memory 12 previously.

The reduced preview producing section 534 reads the main image information from the memory 12. The main image information initially describes either the apparatus or print paper, and then describes a setting if the operator has set either the apparatus or print paper after the initial information.

Upon reading the main image information from the memory 12, at S215, the reduced preview producing section 534 makes a decision based on the main image information to determine whether the preview image to be displayed as a main image is the apparatus preview image 2100 or the printing image preview image 2200.

If it is determined at S215 that the preview image to be displayed as a main image is the apparatus preview image 2100, then the program proceeds to S220 where the reduced preview producing section 534 positions the apparatus preview image 2100 at an area where main image displaying frame 1011 (FIG. 3A) is located.

At S225, the reduced preview producing section 534 reduces the printing image preview image 2200 to the size of the reduced image. At S230, the reduced preview producing section 534 then positions the reduced printing image preview image 2200 at an area where the reduced image displaying frame 1012 (FIG. 3A) is located in the common preview screen 1001. As a result, the common preview image PR1a shown in FIG. 3A is created. This completes the process for producing a common preview screen.

At S215, if it is determined that the preview image to be displayed as a main image is the printing image preview image 2200, the program proceeds to S240 where the reduced preview producing section 534 positions the printing image preview image 2200 at an area where the main image displaying frame 1011 (FIG. 3B) is located in the common preview screen 1001.

At S245, the reduced preview producing section 534 reduces the apparatus preview image 2100 to the size of the reduced image. At S250, the reduced preview producing section 534 then positions the reduced apparatus preview image 2100 at an area where the reduced image displaying frame 1012 (FIG. 3B) is located on the common preview screen 1001. As a result, the common preview image PR1b shown in FIG. 3B is created. This completes the process for producing a common preview screen.

It is to be noted that the common preview image PR1a and the common preview image PR1b are configured such that one of the apparatus preview image 2100 and printing image preview image 2200 is a main image and the other is a reduced image, thereby allowing the operator to recognize the setting information about the driver function without difficulty.

The common preview screen 1001 may be configured such that the position of the reduced image displaying frame 1012 may be different for the apparatus preview image 2100 and the printing image preview image 2200, thereby allowing the user to select one of the apparatus preview image 2100 and printing image preview image 2200 without difficulty.

For example, in FIGS. 3A and 3B, the common preview screen 1001 is configured such that the lateral position of the reduced image displaying frame 1012 is different for the apparatus preview image 2100 and the printing image preview image 2200.

After executing S230 and S250, the program proceeds to S130 shown in FIG. 5. The dialog screen producing section 532 incorporates the common preview image PR1 produced by the reduced preview producing section 534 into the common preview screen 1001 of the dialog screen D1, thereby producing an update dialog screen D1. The produced update dialog screen D1 is such that the common preview image PR1 appears in all of the tab sheets. The dialog screen producing section 532 outputs the screen information about the update dialog screen D1 to the display controller 11b, which in turn drives the display section 14 to display the update dialog screen D1 (S130). This completes the process for updating the dialog screen D1 shown in FIG. 5.

When the operator operates the mouse to click the reduced image in the dialog screen D1, the display switching process (S130) is executed. In other words, the main image and the reduced image are swapped as shown in FIGS. 3A and 3B.

{Display Switching Process}

FIG. 7 illustrates the display switching process. As shown in FIG. 7, when the display switching process (S300) starts, the display switch commanding section 535 makes a decision to determine whether the operator depressed the reduced image (S305).

The step S305 is carried out as follows:

The inputting controller 11a obtains the screen information about the dialog screen D1 from the dialog screen producing section 532 so that when the operator clicks the mouse, the inputting controller 11a identifies the area specified by clicking the mouse.

If the clicked area is within the common preview screen 1001, the inputting controller 11a outputs information indicative of the clicked area to the display switch commanding section 535, which in turn receives the information as input information inputted by clicking the mouse. The display switch commanding section 535 makes a decision based on the input information to determine whether the clicked area is within the reduced image displaying frame 1012, i.e., whether the obtained input information specifies a reduced image. In this manner, S305 is executed.

If it is determined at S305 that the clicked area is not the reduced image (NO at S305), the display switching process (S130) shown in FIG. 7 ends.

If it is determined at S305 that the clicked area is the reduced image (YES at S305), the program proceeds to S310. In other words, the display switch commanding section 535 determines that the operator switched between the main image and the reduced image, and therefore outputs the switching command to the reduced preview producing section 534.

As S310, upon reception of the switching command, the reduced preview producing section 534 updates the main image and the reduced image that have been registered with the memory 12, so that the current main image becomes a new reduced image and the current reduced image becomes a new main image.

At S315, the process for producing the common preview screen at S125 shown in FIG. 6 is carried out. The dialog screen producing section 532 incorporates the common preview image PR1 produced by the reduced preview producing section 534 into the common preview screen 1001 of the dialog screen D1, thereby producing an update dialog screen D1. The update dialog screen D1 is configured such that the common preview image PR1 appears in all of the tab sheets. The dialog screen producing section 532 outputs the produced screen information about the update dialog screen D1 to the display controller 11b, which in turn drives the display section 14 to display the update dialog screen D1 (S320). As a result, the main image and reduced image on the dialog screen D1 are swapped.

At S325, the dialog screen producing section 532 changes the main image information registered with the memory 12, so that current reduced image becomes a new main image and the current main image becomes a new reduced image. This completes the display switching process performed at S300 shown in FIG. 7.

{Features of Information Processing Apparatus}

The features of the information processing apparatus 10 according to the first embodiment will be described. In order to describe the features in an easy-to-understand way, a virtual image processing apparatus 10Z will be described as a comparison apparatus. The information processing apparatus 10 according to the first embodiment will then be described in comparison with the virtual image processing apparatus 10Z.

Figure 13:
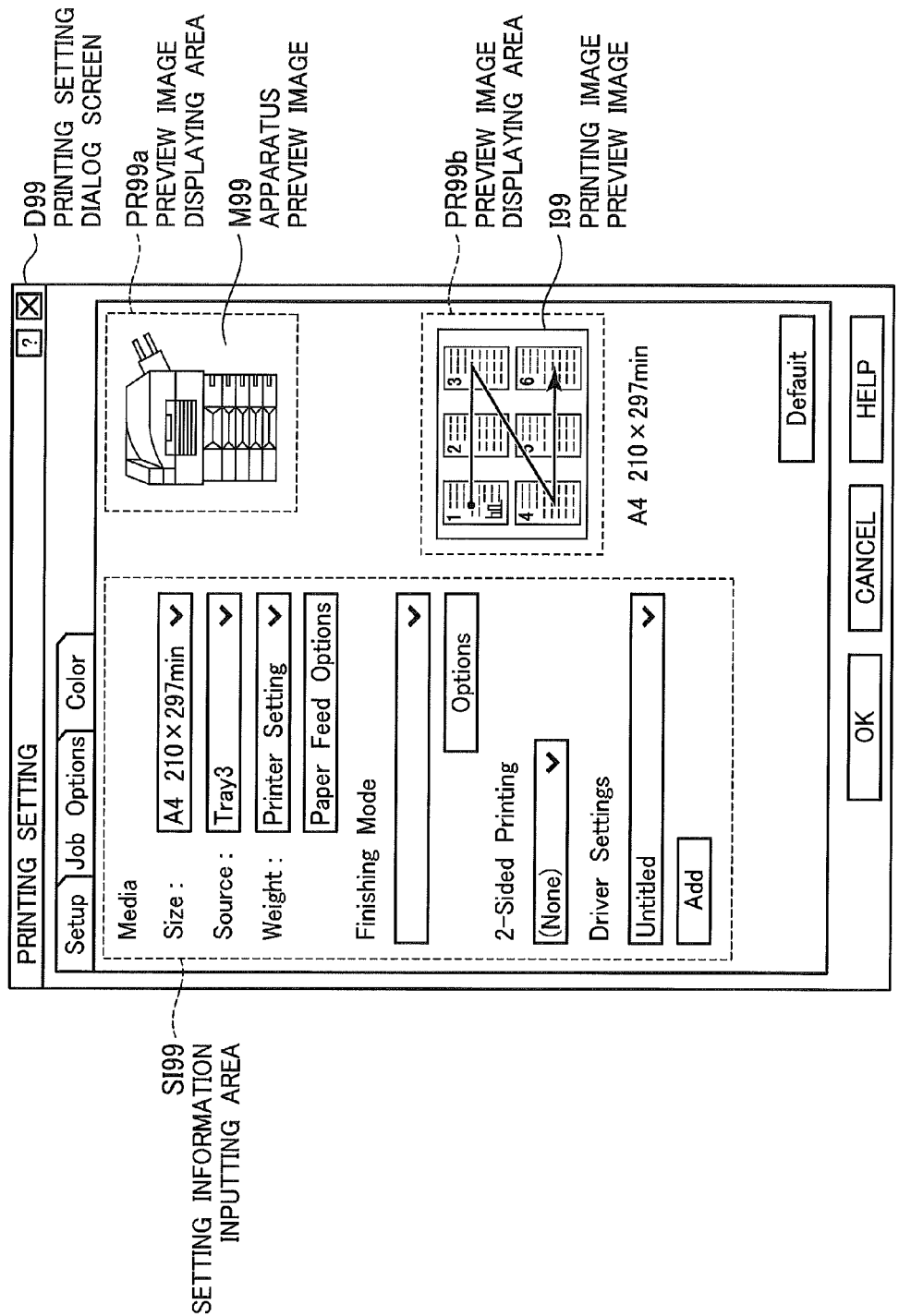
FIG. 13 illustrates an example of the printing setting dialog screen of a comparison example.

FIG. 13 illustrates an example of a printing setting dialog screen D99. The virtual image processing apparatus 10Z produces the printing setting dialog screen as shown in FIG. 13.

The information processing apparatus 10Z (not shown) has a display section that displays the printing setting dialog screen D99. The printing setting dialog screen D99 includes a setting information inputting area SI99 and preview image displaying areas PR99a and PR99b. The setting information inputting area SI99 is an area into which the setting information about the driver function is input by the operator. The preview image displaying areas PR99a is an area in which the apparatus preview image M99 is displayed. The preview image displaying area PR99b is an area in which the printing image preview image 199 is displayed.

In the information processing apparatus 10Z, the printing setting dialog screen D99 displays different preview images for different tab sheets. When a plurality of preview images, e.g., the apparatus preview image and the printing image preview image, are displayed within a single tab sheet, the respective images are displayed in a smaller display area.

Looking at the preview image, e.g., the apparatus preview image M99 and the printing image preview image 199 shown in FIG. 13, the operator checks the input information that is inputted into the setting information inputting area SI99. If the operator determines that the input information is appropriate, the operator commands the information processing apparatus 10Z to perform printing.

In response to the command inputted by the operator, the information processing apparatus 10Z produces plot data including characters, graphics, and tables, and then produces print data based on the plot data, and finally sends the print data to the printer 20. In this manner, the image processing apparatus 10Z have the printer 20 print the image.

In contrast to the information processing apparatus 10Z, the information processing apparatus 10 according to the first embodiment has the following features.

(1) The information processing apparatus 10Z displays the printing setting dialog screen D99 in which different preview images appear in different tab sheets. For this reason, the operator is unable to refer to the setting information inputted through other tab sheet than the currently displayed tab sheet.

In contrast, the information processing apparatus 10 according to the first embodiment is configured such that the preview image PR1 appears in a plurality of tab sheets, preferably all of the tab sheets. This allows the operator to see the items of setting information, which were inputted through other tab sheets than the currently opened tab sheet. Therefore, the information processing apparatus 10 provides improved operations for inputting and changing the setting information.

(2) When a plurality of preview images are displayed within a tab sheet, the display area of each preview image is smaller in the comparison information processing apparatus 10Z. Therefore, the operator may have some difficulty in understanding the setting information expressed by the respective preview images.

In contrast, the information processing apparatus 10 according to the first embodiment is configured such that one of the apparatus preview image and the printing image preview image is displayed in a main image and the other of the apparatus preview image and the printing image preview image is displayed in a reduced image. This makes it possible to provide a larger display area for a main image in the information processing apparatus 10 than in the comparison information processing apparatus 10Z, so that the setting information expressed by the respective preview image can be displayed in an easy-to-understand way.

As described above, the information processing apparatus 10 according to the first embodiment allows the operator to know the setting information that was input through a different tab sheet.

Second Embodiment

An information processing apparatus 10B according to a second embodiment differs from the information processing apparatus 10 according to the first embodiment in that a plurality of preview images are displayed in overlapped, cascade fashion.

Figure 8:
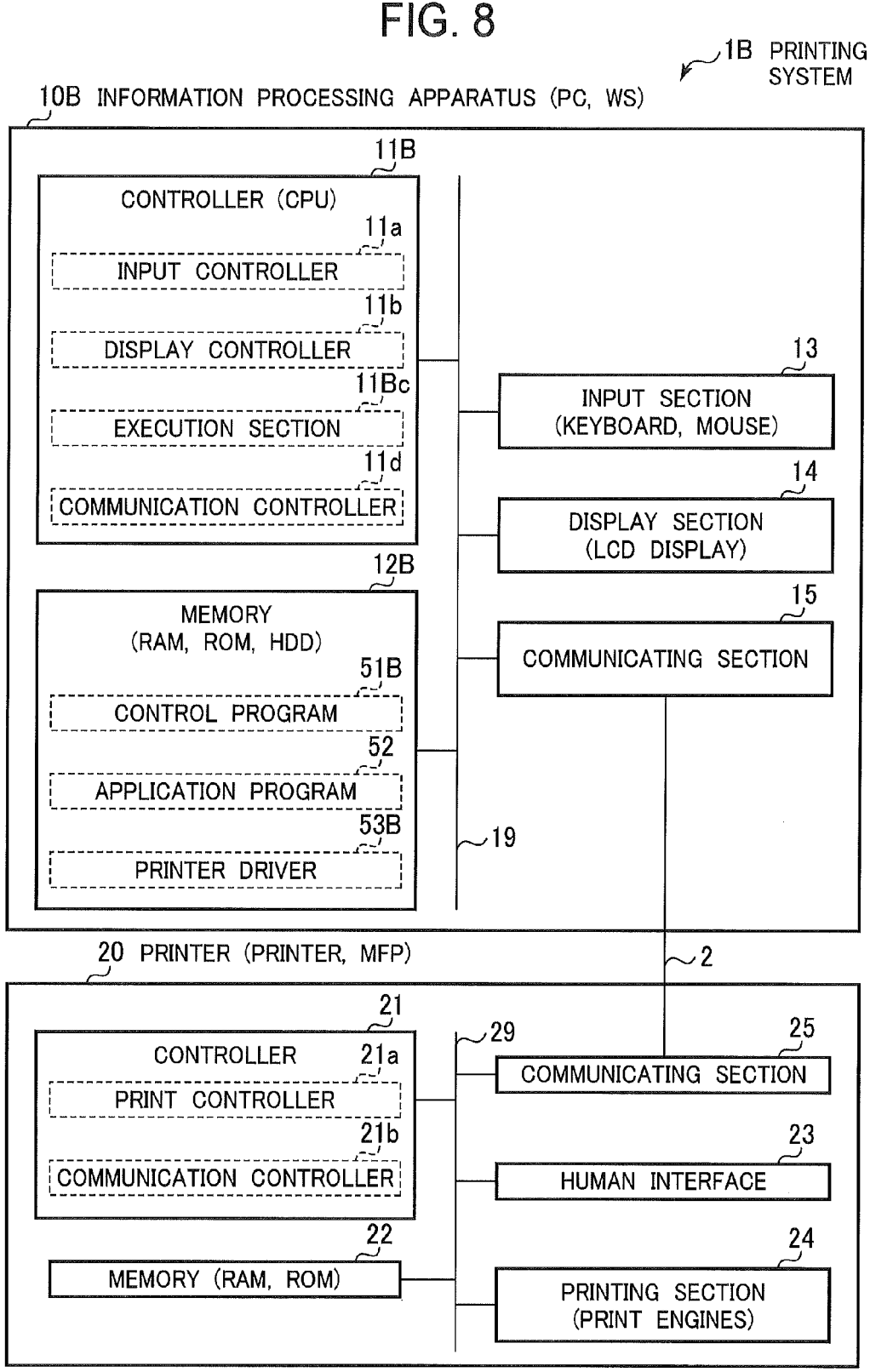
FIG. 8 illustrates the configuration of a printing system according to a second embodiment.
Figure 9:
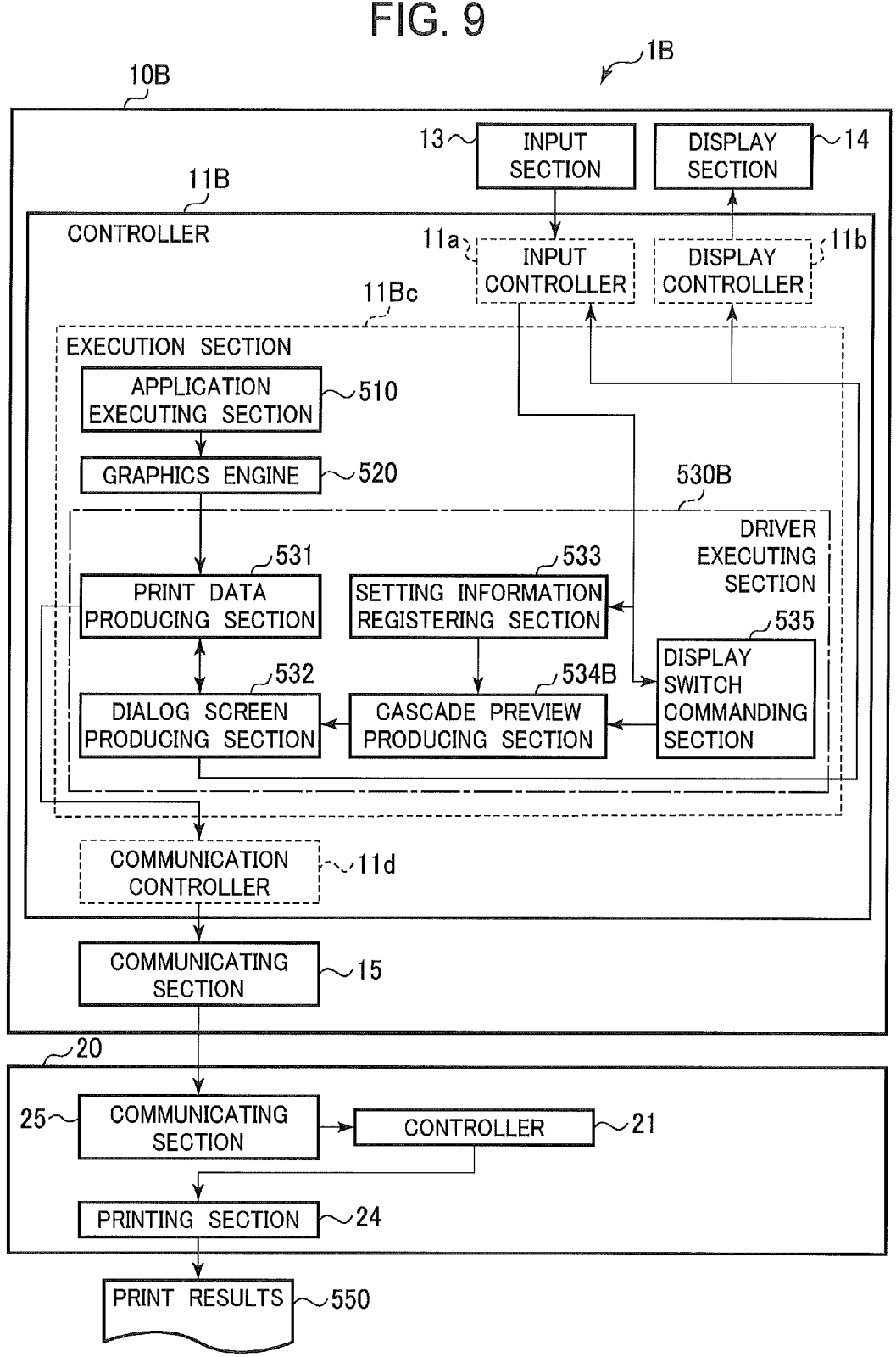
FIG. 9 illustrates the configuration of a pertinent portion of the information processing apparatus according to the second embodiment.

FIG. 8 illustrates the configuration of a printing system 1B that includes the information processing apparatus 10B and a printer 20. FIG. 9 illustrates the configuration of a pertinent portion of the information processing apparatus 10B. The configuration of the information processing apparatus 10B will be described with reference to FIGS. 8 and 9.

Referring to FIG. 8, the information processing apparatus 10B differs from the information processing apparatus 10 in that a memory 12B includes a control program 51B and a printer driver 53B.

The control program 51B is an operating system (OS) program for a CPU that serves as a controller 11B. When the controller 11B executes the printer driver 53B, the controller 11B serves as an execution section 11Bc.

The execution section 11Bc includes a driver executing section 530B having a cascade preview producing section 534B as opposed to the execution section 11c of the first embodiment that includes the driver executing section 530 having the reduced preview producing section 534.

The cascade preview producing section 534B produces a common preview image PR2 displayed on a dialog screen D2. The common preview image PR2 includes a plurality of preview images (hereinafter cascaded images) displayed in overlapped, cascade fashion.

{Example of Printing Setting Dialog Screen}

Figure 10A:
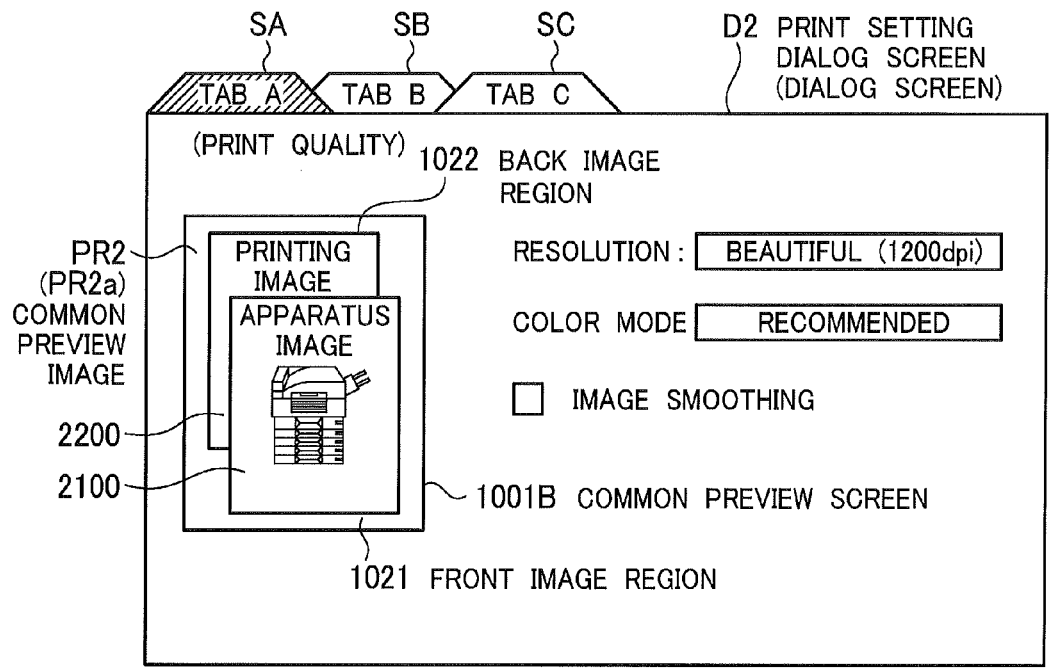
FIGS. 10A and 10B illustrate an example of a printing setting dialog screen according to the second embodiment.
Figure 10B:
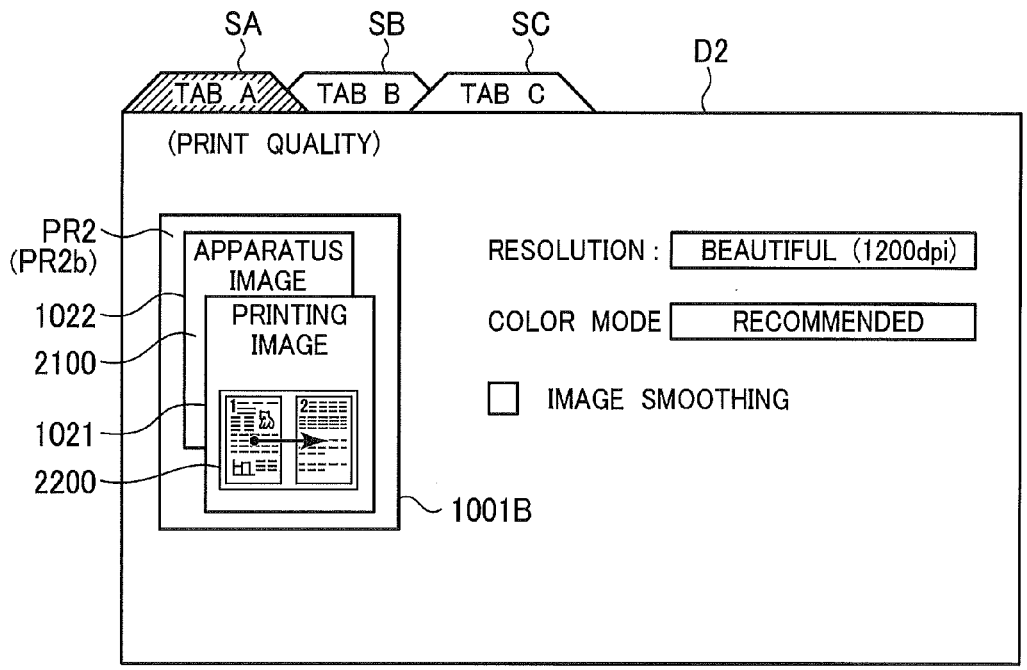

FIGS. 10A and 10B illustrate an example of a printing setting dialog screen according to the second embodiment. The printing setting dialog screen will be described with reference to FIGS. 10A and 10B. A dialog screen producing section 532 produces the dialog screen D2 shown in FIGS. 10A and 10B as the printing setting dialog screen.

The dialog screen D2 of the second embodiment differs from the dialog screen D1 of the first embodiment in that a common preview screen 1001B is displayed.

The common preview screen 1001B displays cascaded images as opposed to the common preview image 1001 in which the main image and reduced image are displayed.

The common preview image PR2, which includes images displayed in overlapped, cascade fashion, appears in the common preview screen 1001B. The common preview screen 1001B includes a front image region 1021 and a back image region 1022 that are displayed in overlapped, cascade fashion.

The common preview image PR2a in FIG. 10A includes the apparatus preview image 2100 that appears in the front image region 1021 and the printing image preview image 2200 that appears in the back image region 1022.

The common preview image PR2b in FIG. 10B includes the printing image preview image 2200 that appears in the front image region 1021 and the apparatus preview image 2100 that appears in the back image region 1022.

{Outline of Operation of Information Processing Apparatus}

The information processing apparatus 10B is configured such that an application executing section 510 produces and/or edits data including characters, graphics, and tables. When an operator operates the input section 13 to call the printer driver 53B so that the printer 20 prints the produced data including characters, graphics, and tables, the dialog screen producing section 532 produces the dialog screen D2 (FIGS. 10A and 10B), and outputs the produced dialog screen D2 to a display controller 11b, which in turn drives a display section 14 to display the dialog screen D2.

If the setting information about the driver function inputted by the operator has been registered with the memory 12, the reduced preview producing section 534 produces the common preview image PR2 (FIGS. 10A and 10B) based on the setting information registered with the memory 12. If the setting information about the driver function inputted by the operator has not been registered with the memory 12, the reduced preview producing section 534 produces the common preview image PR2 (FIGS. 10A and 10B) based on the initial setting information registered with the memory in advance.

The cascade preview producing section 534B outputs the image information about the produced preview image PR2 to the dialog screen producing section 532, which in turn incorporates the preview image PR2 into the common preview screen 1001B of the dialog screen D2, and then outputs the screen information about the dialog screen D2 to the display controller 11b. The display controller 11b drives the display section 14 to display the dialog screen D2 in which the common preview image PR2 appears in all of the tab sheets.

The operator selects a desired item of setting information from among a variety of items of setting information about the driver function displayed in the dialog screen D2. The setting information registering section 533 registers the input setting information about the driver function with the memory 12, and outputs the selected item of setting information to the cascade preview producing section 534B.

Upon reception of the setting information about the driver function, the cascade preview producing section 534B produces the common preview image PR2 (FIGS. 10A and 10B) based on the input setting information about the driver function, and then outputs the screen information of the produced common preview image PR2 to the dialog screen producing section 532.

Upon reception of the setting information about the driver function, the dialog screen producing section 532 incorporates the preview image PR2 into the common preview screen 1001B of the dialog screen D2, and then outputs the screen information of the dialog screen D2 to the display controller 11b. The display controller 11b then drives the display section 14 to display the dialog screen D2 in which the common preview image PR2 appears in all of the tab sheets.

When the operator wants to see the back image in the back image region 1022 of the (FIGS. 10A and 10B) about dialog screen D2, the operator operates the mouse to click the back image. A display switch commanding section 535 outputs a switching command, which commands to switch between the front image and the back image, to the cascade preview producing section 534B. In response to the command, the cascade preview producing section 534B produces a new common preview image PR2b (FIG. 10B) in which the front image and back image have been swapped.

Specifically, the cascade preview producing section 534B produces a new back image based on the currently displayed front image and a new front image based on the currently displayed back image, using the template images 3100 and 3200 (FIGS. 4A and 4B) that have been registered with the memory 12. The cascade preview producing section 534B then produces the common preview image PR2b (FIG. 10B) in which the new front and back images are arranged in overlapped, cascade fashion.

The cascade preview producing section 534B outputs the image information about the produced common preview image PR2b to the dialog screen producing section 53, which in turn incorporates the common preview image PR2b into the common preview screen 1001B on the dialog screen D2. In this manner, the dialog screen producing section 532 produces an update dialog screen D2 in which the common preview image PR2a has been updated with the common preview image PR2b.

The dialog screen producing section 532 outputs the screen information about the update dialog screen D2 to the display controller 11b, which in turn drives the display section 14 to display the updated dialog screen D2.

The operator refers to the dialog screen D2 to determine whether printing should be performed. If the operator determines that the printing should be performed, then he operates the input section 13 (FIG. 1) so that the information processing apparatus 10B displays a dialog screen (not shown) that has a print start button (not shown). The operator depresses the print start button to command to print data including characters, graphics, and tables.

Just as the information processing apparatus 10 according to the first embodiment, the information processing apparatus 10B produces the print data, and sends the produced print data to the printer 20. The printer performs printing to output print results 550.

{Operation of Information Processing Apparatus}

Figure 11:
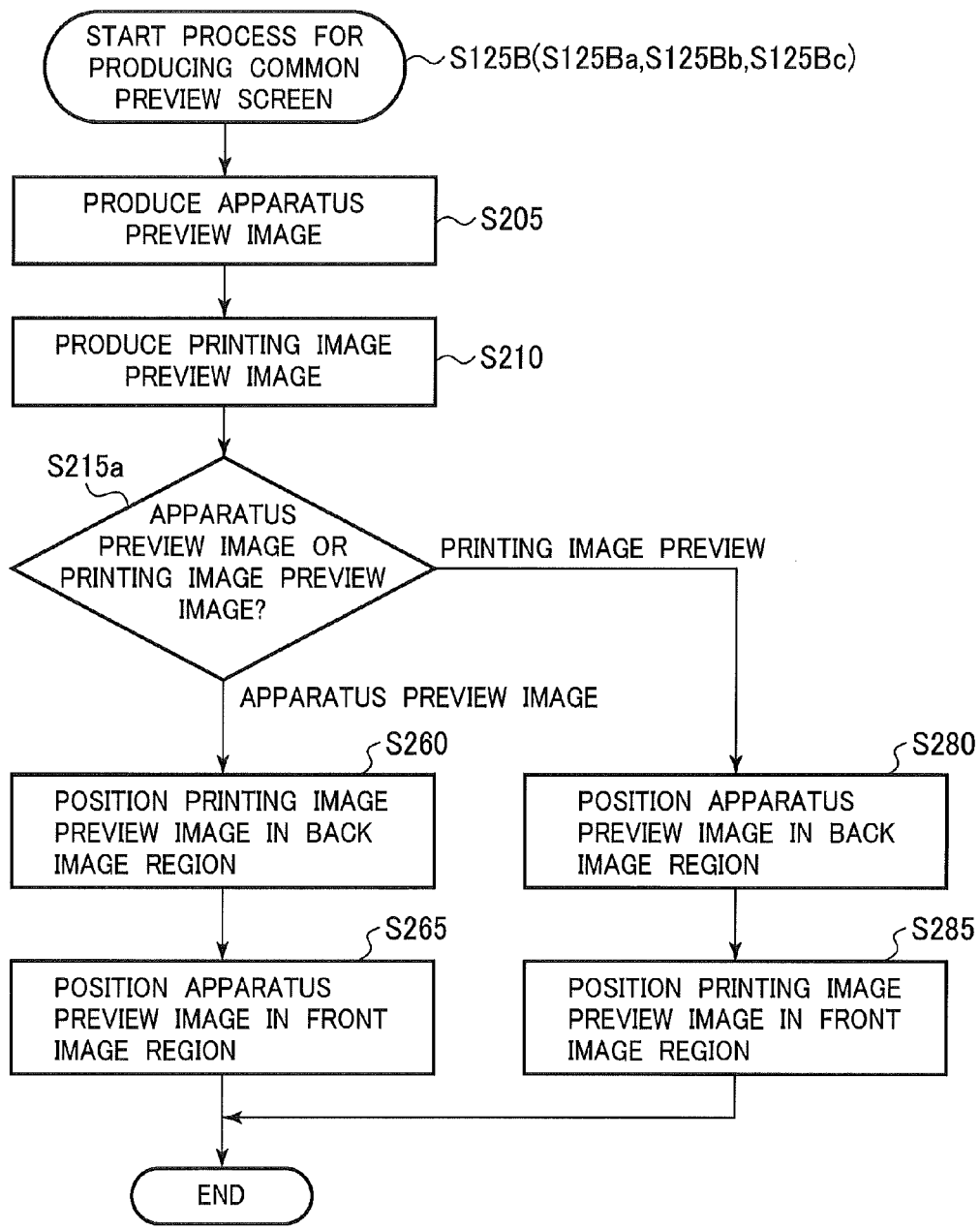
FIGS. 11 and 12 are flowcharts illustrating the operation of the information processing apparatus according to the second embodiment.
Figure 12:
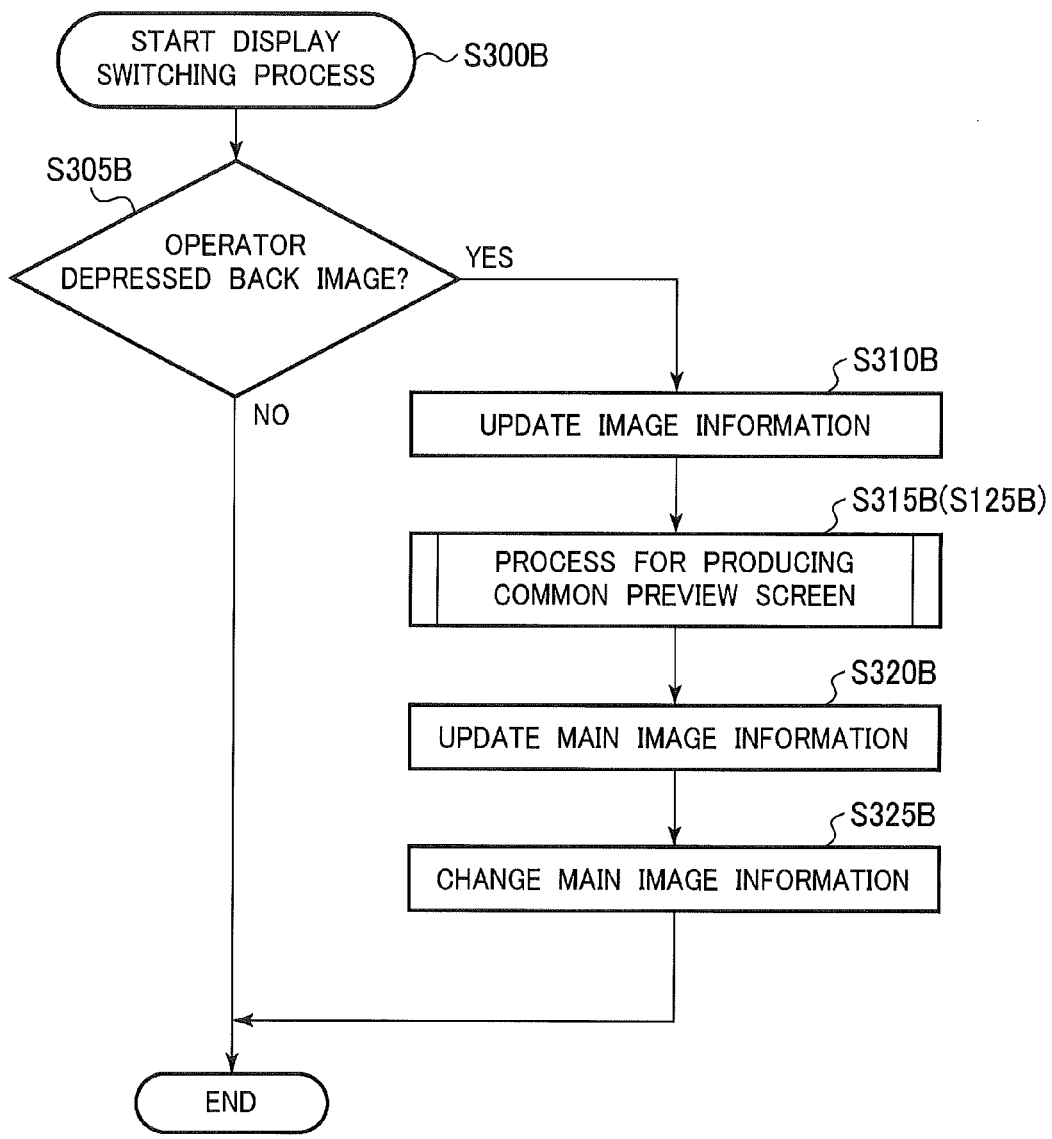

FIGS. 11 and 12 are flowcharts illustrating the operation of the information processing apparatus 10B.

The information processing apparatus 10B operates generally in the same way as the information processing apparatus 10 described with reference to FIGS. 5-7. The operation of the information processing apparatus 10B will be described mainly in terms of a portion different from the information processing apparatus 10.

The information processing apparatus 10B differs from the information processing apparatus 10 in that a step S125B shown in FIG. 11 is executed and a step S300B shown in FIG. 12 is executed.

A process for producing a common preview screen will be described.

Referring to FIG. 11, the process for producing a common preview screen starts at S125B. The cascade preview producing section 534B produces the apparatus preview image 2100 at S205, and the printing image preview image 2200 at S210. It is to be noted that the apparatus preview image 2100 and the printing image preview image 2200 have an identical size.

The cascade preview producing section 534B reads the main image information from the memory 12, and then makes a decision based on the main image information to determine whether the preview images to be displayed as a front image is the apparatus preview image 2100 or the printing image preview image 2200 (S215a).

If the preview image to be displayed as a front image is the apparatus preview image 2100, the program proceeds to S260 where the cascade preview producing section 534B positions the printing image preview image 2200 at the back image region 1022 (FIG. 10A) in the common preview screen 1001B (S260).

At S265, the cascade preview producing section 534B positions the apparatus preview image 2100 in the front image region 1021 (FIG. 10A) in the common preview screen 1001B, thus producing the common preview image PR2a (FIG. 10A). This completes the process for producing a common preview screen at S125B.

If the preview image to be displayed as a front image is the printing image preview image 2200, the program proceeds to S280 where the cascade preview producing section 534B positions the apparatus preview image 2100 in the back image region 1022 (FIG. 10B) in the common preview screen 1001B.

At S285, the cascade preview producing section 534B positions the printing image preview image 2200 in the front image region 1021 (FIG. 10B) in the common preview screen 1001B, thereby producing the common preview image PR2b (FIG. 10B). This completes the process for producing a common preview screen at S125B.

In this manner, the thus produced common preview images PR2a and PR2b are displayed such that one of the apparatus preview image 2100 and the printing image preview image 2200 is a front image and the other is a back image. This allows the operator to recognize the setting information about the driver function without difficulty.

The display switching process performed at S300B shown in FIG. 12 will be described. The S300B shown in FIG. 12 is similar to S300 shown in FIG. 7.

As is clear from FIG. 12, upon initiation of S300B, the display switch commanding section 535 makes a decision to determine whether the operator has depressed the back image (S305B).

The process at S305B is performed as follows: The inputting controller 11a obtains the screen information of the dialog screen D2 from the dialog screen producing section 532, and identifies the area on the dialog screen D2 clicked with the mouse.

If the clicked area is within the common preview screen 1001B, the inputting controller 11a outputs information indicative of the clicked area to the display switch commanding section 535. Thus, the display switch commanding section 535 obtains the information about the area clicked by the operator. The display switch commanding section 535 makes a decision based on the obtained information to determine whether the clicked area is within the front image region 1021 or the back image region 1022. This completes the process at S305B.

If the clicked area is not within the back image region 1022 (NO at S305B), the program ends.

If the clicked area is within the back image region (YES at S305B), the program proceeds to S310B. In other words, the display switch commanding section 535 determines that the operator commanded to switch between the front image and the back image, and then outputs the switching command to the cascade preview producing section 534B.

In response to the switching command, the cascade preview producing section 534B updates the image information about the front image and back image registered with the memory 12 so that the current front image becomes a new back image and the current back image becomes a new front image (S310B).

At S315B, the process for producing a common preview screen at S125B shown in FIG. 11 is initiated. The dialog screen producing section 532 incorporates the common preview image PR2 produced by the cascade preview producing section 534B into the common preview screen 1001B of the dialog screen D2, thereby producing update dialog screen D2. The update dialog screen D2 is configured such that the common preview image PR2 appears in the main tab sheets or preferably all of the tab sheets. The dialog screen producing section 532 outputs the screen information about the produced update dialog screen D2 to the display controller 11*b*, which in turn drives the display section 14 to display the screen information of the update dialog screen D2 (S320B). As a result, the front image and the back image in the dialog screen D2 are swapped.

At S325B, the dialog screen producing section 532 updates the content of the main image information registered with the memory 12 so that the current back image becomes a new front image and the current front image becomes a new back image. This completes the display switching process performed at S300B shown in FIG. 12.

As described above, the information processing apparatus 10B according to the second embodiment allows the operator to recognize the setting information inputted through a tab sheet other than a currently opened tab sheet without difficulty. The common preview images PR2 are displayed in overlapped, cascade fashion so that the operator can switch the preview image intuitively.

The present invention is not limited to the first and second embodiments, and may be modified in any way without departing the scope of the invention.

For example, the present invention may be applied not only to printers but also to image forming apparatus including an MFP which includes a facsimile function, a scanner function, a copying function, and so on.

The reduced preview producing section 534 of the information processing apparatus 10 according to the first embodiment functions as a common preview producing section. The information processing apparatus 10 may be configured such that the dialog screen producing section 532 functions as a common preview producing section.

For example, the information processing apparatus 10 and 10B may take the form of not only PCs but also workstations, tablet devices, or smart phones. For example, the input section 13 of the information processing apparatus 10 and 10B may take the form of a coordinate digitizer, e.g., a touch screen in place of a mouse.

For example, the dialog screens D1 and D2 may be modified in terms of the content in the setting information input area 1003 of the respective tab sheets, layout in the tab sheets, and the number of tab sheets.

For example, when the dialog screen producing section 532 is to produce other dialog screen (not shown) than the dialog screens D1 and D2, the dialog screen producing section 532 may incorporate the common preview image PR1 used in the dialog screen D1 and D2 into other dialog screen.

What is claimed is:

1. An information processing apparatus connected to a printer, comprising:
    a dialog screen producing section configured to produce a dialog screen including a plurality of tab sheets that prompt an operator to input first setting information for printing;
    a common preview producing section configured to produce a common preview image that is displayed on the dialog screen, the common preview image appearing in the plurality of tab sheets; and
    a display section configured to display the dialog screen and the common preview image,
    wherein the common preview producing section produces an apparatus preview image representative of information about the printer and a printing image preview image representative of information about an overall printed image; and
    wherein the common preview producing section produces a large image from one of the apparatus preview image and the printing image preview image and a small image from the other of the apparatus preview image and the printing image preview image such that the large image and the small image appear simultaneously in the common preview image.

2. The information processing apparatus according to claim 1 further comprising a memory that stores the first setting information inputted by the operator and second setting information stored in advance;
    wherein when the first setting information is present in the memory, the common preview producing section produces the common preview image based on the first setting information; and
    wherein when the first setting information is not present in the memory, the common preview producing section produces the common preview image based on the second setting information.

3. The information processing apparatus according to claim 1, further comprising a memory that stores a plurality of template images therein; and
    wherein the common preview producing section produces the apparatus preview image based on a first one of the plurality of template images, and produces the printing image preview image based on a second one of the plurality of template images.

4. The information processing apparatus according to claim 1, further comprising a display switch commanding section configured to output a switch command to the common preview producing section;
    wherein when the operator commands a switching between the large image and the small image, the display switch commanding section outputs the switch command to the common preview producing section.

5. The information processing apparatus according to claim 1 further comprising a memory that stores the first setting information inputted by the operator and second setting information stored in advance; and a setting information registering section configured to register the first setting information, which is inputted by the operator through one of the plurality of tab sheets, with the memory.

6. The information processing apparatus according to claim 1, wherein when the dialog screen producing section produces a new dialog screen, the dialog screen producing section incorporates the common preview image, which is used for displaying existing dialog screens, into the new dialog screen.

7. The information processing apparatus according to claim 1, wherein each tab sheet includes at least one item of corresponding setting information, and the large image includes a plurality of areas, each area corresponding to at least one item of setting information; and wherein if the operator selects an area that corresponds to the at least one item of setting information displayed on a currently displayed tab sheet, the selection of the area causes the at least one item of setting information to change.

8. The information processing apparatus according to claim 1, wherein each tab sheet includes at least one item of corresponding setting information, and the large image includes a plurality of areas, each area corresponding to at least one item of setting information; and wherein if the operator selects an area that corresponds to the at least one item of setting information existing on a tab sheet different from a currently displayed tab sheet, the selection of the area causes the display section to switch from the currently displayed tab sheet to the tab sheet that includes the at least one item of setting information corresponding to the selected area.

9. The information processing apparatus according to claim 1, wherein the common preview image produced by the common preview producing section appears in all of the plurality of tab sheets.

10. An information processing apparatus connected to a printer, comprising:

a dialog screen producing section configured to produce a dialog screen including a plurality of tab sheets that prompt an operator to input first setting information for printing;

a common preview producing section configured to produce a common preview image that is displayed on the dialog screen, the common preview image appearing in the plurality of tab sheets; and a display section configured to display the dialog screen and the common preview image, wherein the common preview producing section produces an apparatus preview image representative of information about the printer and a printing image preview image representative of information about an overall printed image; and wherein the common preview producing section produces a front image from one of the apparatus preview image and the printing image preview image and a back image from the other of the apparatus preview image and the printing image preview image such that the front image and the back image are displayed in overlapped, cascade fashion in the common preview image, the back image being behind the front image.

11. The information processing apparatus according to claim 10, further comprising a memory that stores a plurality of template images in advance;

wherein the common preview producing section produces the apparatus preview image based on a first one of the plurality of template images, and produces the printing image preview image based on a second one of the plurality of template images.

12. The information processing apparatus according to claim 10, further comprising a display switch commanding section configured to output a switch command to the common preview producing section, the switch command commanding a switching between the front image and the back image;

wherein when the operator commands a switching between the front image and the back image, the display switch commanding section outputs the switch command to the common preview producing section.

13. The information processing apparatus according to claim 10, wherein each tab sheet includes at least one item of corresponding setting information, and the front image includes a plurality of areas, each area corresponding to at least one item of setting information; and wherein if the operator selects an area that corresponds to the at least one item of setting information displayed on a currently displayed tab sheet, the selection of the area causes the at least one item of setting information to change.

14. The information processing apparatus according to claim 10, wherein each tab sheet includes at least one item of corresponding setting information, and the front image includes a plurality of areas, each area corresponding to at least one item of setting information; and wherein if the operator selects an area that corresponds to the at least one item of setting information existing on a tab sheet different from a currently displayed tab sheet, the selection of the area causes the display section to switch from the currently displayed tab sheet to the tab sheet that includes the at least one item of setting information corresponding to the selected area.

15. The information processing apparatus according to claim 10, wherein the common preview image produced by the common preview producing section appears in all of the plurality of tab sheets.

16. A method for setting printing information, comprising:

producing a dialog screen including a plurality of tab sheets that prompts an operator to input first setting information for printing;

producing a common preview image that is displayed on the dialog screen so that the common preview image appears in the plurality of tab sheets; and displaying the dialog screen and the common preview image simultaneously, wherein the step of displaying the dialog screen and the common preview image simultaneously includes:

producing a large image based on one of an apparatus preview image representative of information about a printer and a printing image preview image representative of information about an overall printed image;

producing a small image based on the other of the apparatus preview image representative of information about the printer and the printing image preview image representative of information about the overall printed image; and displaying the large image and the small image simultaneously.

17. The method according to claim 16, wherein the step of producing the common preview image includes:

producing the common preview image based on the first setting information when the first setting information inputted by the operator through one of the plurality of tab sheets is available; and producing the common preview image based on second setting information stored in advance when the first setting information inputted through the one of the plurality of tab sheets is not available.

18. The method for setting printing information according to claim 16 further comprising:
assigning at least one item of setting information to each tab sheet;
assigning a plurality of areas of the large image to a plurality of items of setting information, each area corresponding to the at least one item of setting information in a corresponding one of the plurality of tab sheets;
displaying the large image to the operator; and
allowing the operator to set only the at least one item of setting information displayed on a currently displayed tab sheet, if the operator selects an area on the large image that corresponds to the at least one item of setting information existing on the currently displayed tab sheet.

19. The method for setting printing information according to claim 16 further comprising:
assigning at least one item of setting information to each tab sheet;
assigning a plurality of areas of the large image to a plurality of items of setting information, each area corresponding to the at least one item of setting information on a corresponding one of the plurality of tab sheets;
displaying the large image to the operator; and
upon selection of an area by the operator, switching from a currently displayed tab sheet to a tab sheet that includes the at least one item of setting information corresponding to the selected area.

20. The method according to claim 14, wherein the common preview image that is produced during the producing a common preview image step appears in all of the plurality of tab sheets.

21. A method for setting printing information, comprising:
producing a dialog screen including a plurality of tab sheets that prompts an operator to input first setting information for printing;
producing a common preview image that is displayed on the dialog screen so that the common preview image appears in the plurality of tab sheets; and
displaying the dialog screen and the common preview image simultaneously,
wherein the step of displaying the dialog screen and the common preview image simultaneously includes:
producing a front image based on one of an apparatus preview image representative of information about a printer and a printing image preview image representative of information about an overall printed image;
producing a back image based on the other of the apparatus preview image representative of information about the printer and the printing image preview image representative of information about the overall printed image; and
displaying the back image and the front image simultaneously in overlapped, cascade fashion on the dialog screen.

22. The method for setting printing information according to claim 21 further comprising:
assigning at least one item of setting information to each tab sheet;
assigning a plurality of areas of the front image to a plurality of items of setting information, each area corresponding to the at least one item of setting information in a corresponding one of the plurality of tab sheets;
displaying the front image to the operator; and
allowing the operator to set only the at least one item of setting information displayed on a currently displayed tab sheet, if the operator selects an area on the front image that corresponds to the at least one item of setting information existing on the currently displayed tab sheet.

23. The method for setting printing information according to claim 21 further comprising:
assigning at least one item of setting information to each tab sheet;
assigning a plurality of areas of the front image to a plurality of items of setting information, each area corresponding to the at least one item of setting information on a corresponding one of the plurality of tab sheets;
displaying the front image to the operator; and
upon selection of an area by the operator, switching from a currently displayed tab sheet to a tab sheet that includes the at least one item of setting information corresponding to the selected area.

24. The method according to claim 21, wherein the common preview image that is produced during the producing a common preview image step appears in all of the plurality of tab sheets.

25. An information processing apparatus connected to a printer, comprising:
a dialog screen producing section configured to produce a dialog screen including a plurality of tab sheets that prompt an operator to input first setting information for printing;
a common image producing section configured to produce a common image that is displayed on the dialog screen, the common image appearing in the plurality of tab sheets; and
a display section configured to display the dialog screen and the common image,
wherein the common image producing section produces an apparatus image representative of information about the printer and a printing image representative of information about an overall printed image; and
wherein the common image producing section produces a large image from one of the apparatus image and the printing image and a small image from the other of the apparatus image and the printing image such that the large image and the small image appear simultaneously in the common image.

26. An information processing apparatus connected to a printer, comprising:
a dialog screen producing section configured to produce a dialog screen including a plurality of tab sheets that prompt an operator to input first setting information for printing;
a common image producing section configured to produce a common image that is displayed on the dialog screen, the common image appearing in the plurality of tab sheets; and
a display section configured to display the dialog screen and the common image,
wherein the common image producing section produces an apparatus image representative of information about the printer and a printing image representative of information about an overall printed image; and
wherein the common image producing section produces a front image from one of the apparatus image and the printing image and a back image from the other of the apparatus image and the printing image such that the front image and the back image are displayed in overlapped, cascade fashion in the common image, the back image being behind the front image.

27. A method for setting printing information, comprising:
producing a dialog screen including a plurality of tab sheets that prompts an operator to input first setting information for printing;
producing a common image that is displayed on the dialog screen so that the common image appears in the plurality of tab sheets; and
displaying the dialog screen and the common image simultaneously,
wherein the step of displaying the dialog screen and the common image simultaneously includes:
producing a large image based on one of an apparatus image representative of information about a printer and a printing image representative of information about an overall printed image;
producing a small image based on the other of the apparatus image representative of information about the printer and the printing image representative of information about the overall printed image; and
displaying the large image and the small image simultaneously.

28. A method for setting printing information, comprising:
producing a dialog screen including a plurality of tab sheets that prompts an operator to input first setting information for printing;
producing a common image that is displayed on the dialog screen so that the common image appears in the plurality of tab sheets; and
displaying the dialog screen and the common image simultaneously,
wherein the step of displaying the dialog screen and the common image simultaneously includes:
producing a front image based on one of an apparatus image representative of information about a printer and a printing image representative of information about an overall printed image;
producing a back image based on the other of the apparatus image representative of information about the printer and the printing image representative of information about the overall printed image; and
displaying the back image and the front image simultaneously in overlapped, cascade fashion on the dialog screen.

* * * * *